(12) United States Patent
Naito

(10) Patent No.: US 10,599,003 B2
(45) Date of Patent: Mar. 24, 2020

(54) ELECTROCHROMIC DEVICE AND IMAGING APPARATUS

(71) Applicant: CANON KABUSHIKI KAISHA, Tokyo (JP)

(72) Inventor: Go Naito, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/980,943

(22) Filed: May 16, 2018

(65) Prior Publication Data

US 2018/0341162 A1 Nov. 29, 2018

(30) Foreign Application Priority Data

May 23, 2017 (JP) ................. 2017-101553

(51) Int. Cl.
| G02F 1/163 | (2006.01) |
| G03B 11/00 | (2006.01) |
| G02F 1/155 | (2006.01) |
| H04N 5/235 | (2006.01) |
| H04N 5/238 | (2006.01) |
| H04N 5/232 | (2006.01) |
| G03B 9/00 | (2006.01) |
| H04N 5/225 | (2006.01) |
| G02F 1/1514 | (2019.01) |

(52) U.S. Cl.
CPC .............. *G02F 1/163* (2013.01); *G03B 9/00* (2013.01); *G03B 11/00* (2013.01); *H04N 5/238* (2013.01); *H04N 5/2351* (2013.01); *H04N 5/23241* (2013.01); *G02F 1/155* (2013.01); *G02F 2001/15145* (2019.01); *G02F 2203/48* (2013.01); *H04N 5/2254* (2013.01); *H04N 5/23212* (2013.01)

(58) Field of Classification Search
CPC ........... G02F 1/163; G02F 2001/15145; G03B 11/00
See application file for complete search history.

(56) References Cited

U.S. PATENT DOCUMENTS

| 5,294,376 A | 3/1994 | Byker | |
| 2003/0161049 A1* | 8/2003 | Okada | G02B 7/102 359/696 |
| 2007/0019097 A1* | 1/2007 | Fukui | H04N 5/235 348/333.01 |
| 2012/0154891 A1* | 6/2012 | Yeh | G02F 1/153 359/265 |
| 2014/0022395 A1* | 1/2014 | Sasaki | G03B 9/02 348/175 |
| 2016/0229803 A1* | 8/2016 | Lin | C07F 17/02 |

\* cited by examiner

*Primary Examiner* — Clayton E. LaBalle
*Assistant Examiner* — Linda B Smith
(74) *Attorney, Agent, or Firm* — Venable LLP

(57) ABSTRACT

Provided is an electrochromic device including: an electrochromic element including an electrochromic layer disposed between a pair of electrodes; a drive unit, which is connected to a power supply portion included in each of the pair of electrodes to drive the electrochromic element; a controller, which is configured to control the power supply portion; and an orientation detection unit, which is configured to detect an orientation of the electrochromic element. The controller is configured to control the power supply portion depending on output from the orientation detection unit.

20 Claims, 13 Drawing Sheets

A2 IS UPWARD IN VERTICAL
DIRECTION WITH RESPECT TO A1

A2 IS UPWARD IN VERTICAL
DIRECTION WITH RESPECT TO A1

ELECTROCHROMIC DEVICE AND IMAGING APPARATUS

BACKGROUND

Field of the Disclosure

This disclosure relates to an electrochromic device and an imaging apparatus using an electrochromic device.

Description of the Related Art

There is known a neutral-density (ND) filter as a filter configured to reduce, when photography is performed with use of an imaging apparatus, an amount of light that is transmitted to an imaging element at the time of photography without changing photographic conditions, such as a shutter speed, an f-number, and an ISO speed. In recent years, there has been put into practice a variable ND filter, which is capable of changing, when a moving image is taken, an amount of light that is transmitted to an imaging element (hereinafter referred to as "transmitted light amount") even when the moving image is taken. In contrast to the conventional ND filter, the variable ND filter can change a photographic light amount without requiring an attachment/removal operation, and hence can change the photographic light amount seamlessly without interrupting photography even when a moving image is taken.

As one technology used as the variable ND filter, there is a phenomenon called "electrochromic (hereinafter sometimes referred to as "EC") phenomenon". The EC phenomenon is a phenomenon in which a material is colored or decolored through changes in its light absorption region induced by a reversible electrochemical reaction caused at the time of application of a voltage. An electrochemically coloring/decoloring element utilizing the EC phenomenon is referred to as "electrochromic element (EC element)," and is expected to find applications as a light control element (transmitted light amount variation unit) configured to change an optical transmittance. One of the applications is the above-mentioned variable ND filter. It has been known that an organic EC element, in which a low-molecular weight organic material is colored/decolored in a solution state, has advantages of a sufficient contrast ratio in a colored state, a high transmittance in a decolored state, and the like. In addition, it has been known that the organic EC element has an advantage in that its color state can be freely controlled by mixing a plurality of materials having different absorption wavelengths. The use of such EC element in an optical filter requires not only free control (gradation control) of the optical transmittance but also the fact that the wavelength selectivity (absorption spectrum) of light absorption does not greatly change.

As an organic EC element using a low-molecular weight organic material, a structure called "complementary EC element" is widely used. The complementary EC element contains an anodic EC material, which forms cations through an electrochemical oxidation reaction to be colored, and a cathodic EC material, which forms anions through an electrochemical reduction reaction to be colored. It is known that, when the complementary EC element is driven for a long time while being held upright in a gravity direction, a phenomenon (segregation) in which the cations and the anions are separated in the gravity direction within the element occurs. As a reason for the segregation, a difference in tendency of solvation of the cations and the anions with respect to a solvent, for example, a nonaqueous solvent is considered. In general, the cations exhibit strong solvation with the solvent and are bonded strongly to solvent molecules, and hence a specific gravity of the solvent around the cations becomes larger than a specific gravity of the solvent alone. In contrast, the anions reduce solvation, and hence a specific gravity of the solvent around the anions becomes smaller than the specific gravity of the solvent alone. The segregation of the EC materials in the gravity direction occurs with a difference between the specific gravities serving as a driving force. Moreover, when segregation occurs in the element plane, decoloring responsiveness of the cations and the anions, which have been separated, is reduced, and it takes a long time for the cations and the anions to be completely decolored.

In U.S. Pat. No. 5,294,376, there is described an organic EC element, in which a polymer matrix is introduced into an organic EC solution layer to increase a viscosity of the organic EC solution layer and suppress movements of substances, to thereby reduce segregation in the gravity direction.

However, as described in U.S. Pat. No. 5,294,376, there has been a problem in that, when the organic EC solution is increased in viscosity to suppress the movements of the substances, responsiveness of the organic EC element is significantly reduced. This is because the responsiveness of the solution-type organic EC element is greatly influenced by diffusion rates of organic EC materials onto electrode surfaces.

Meanwhile, an imaging apparatus and a variable ND filter (EC element) are changed in direction of gravity and in direction in which the segregation occurs with a change in photographing orientation (so-called "vertical position", "horizontal position", or the like), that is, in orientation in which the imaging apparatus is held.

SUMMARY OF THE INVENTION

This disclosure has been made in view of the above-mentioned related art, and therefore has an object to provide an EC device, which is capable of reducing effects of segregation irrespective of an orientation of an EC element even when used for a long time, and an imaging apparatus using the EC device.

According to one aspect of this disclosure, there is provided an electrochromic device including: an electrochromic element including an electrochromic layer disposed between a pair of electrodes; a drive unit, which is connected to a power supply portion included in each of the pair of electrodes to drive the electrochromic element; a controller, which is configured to control the power supply portion; and an orientation detection unit, which is configured to detect an orientation of the electrochromic element, the electrochromic layer containing: at least one kind of anodic electrochromic material; at least one kind of cathodic electrochromic material; and a solvent, the controller being configured to control the power supply portion depending on output from the orientation detection unit.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Now, referring to FIG. 1 to FIG. 5B and FIG. 12A, a case in which an electrochromic device (EC device) according to a first embodiment of the present invention is used in an imaging apparatus is described. It should be noted, however, that a configuration, relative arrangement, and the like described in the first embodiment are not intended to limit the scope of the present invention unless otherwise specified.

<Imaging Apparatus>

Figure 1:
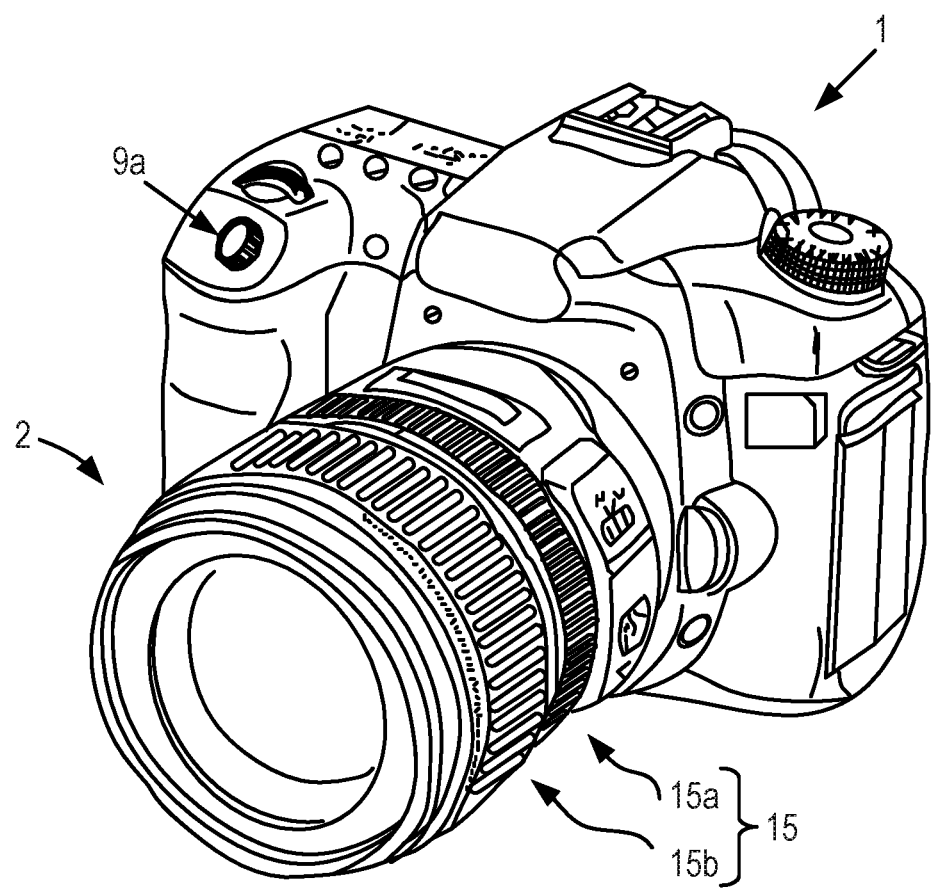
FIG. 1 is a perspective view of an imaging apparatus using an EC device according to a first embodiment of the present invention.
Figure 2A:
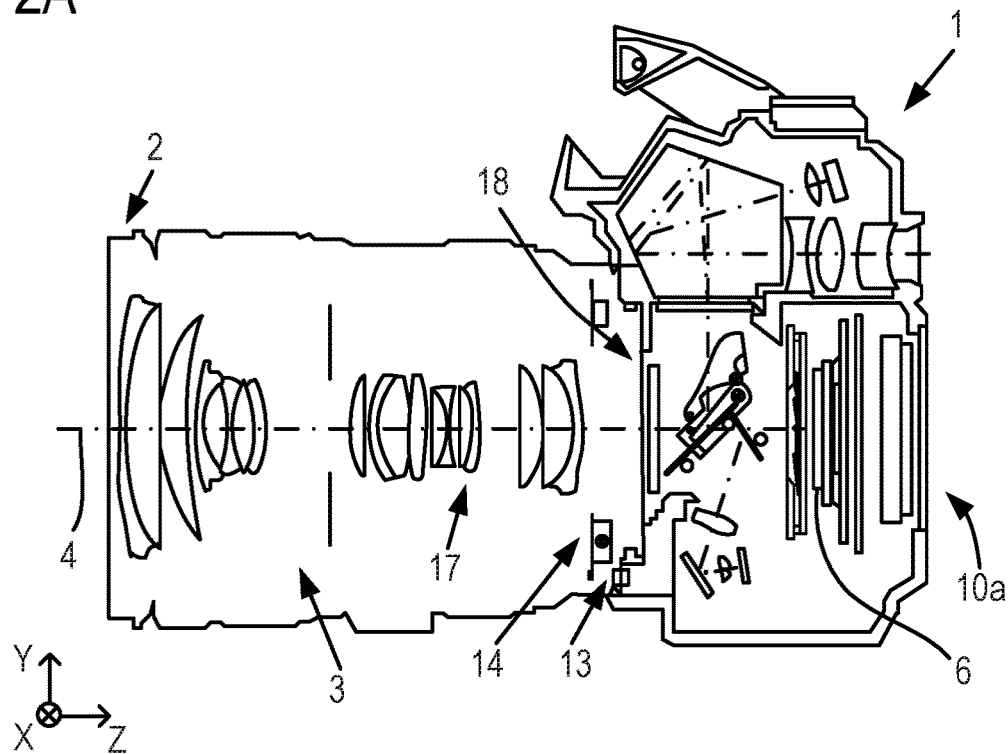
FIG. 2A and FIG. 2B are a central cross-sectional view and a block diagram of the imaging apparatus using the EC device according to the first embodiment of the present invention, respectively.
Figure 2B:
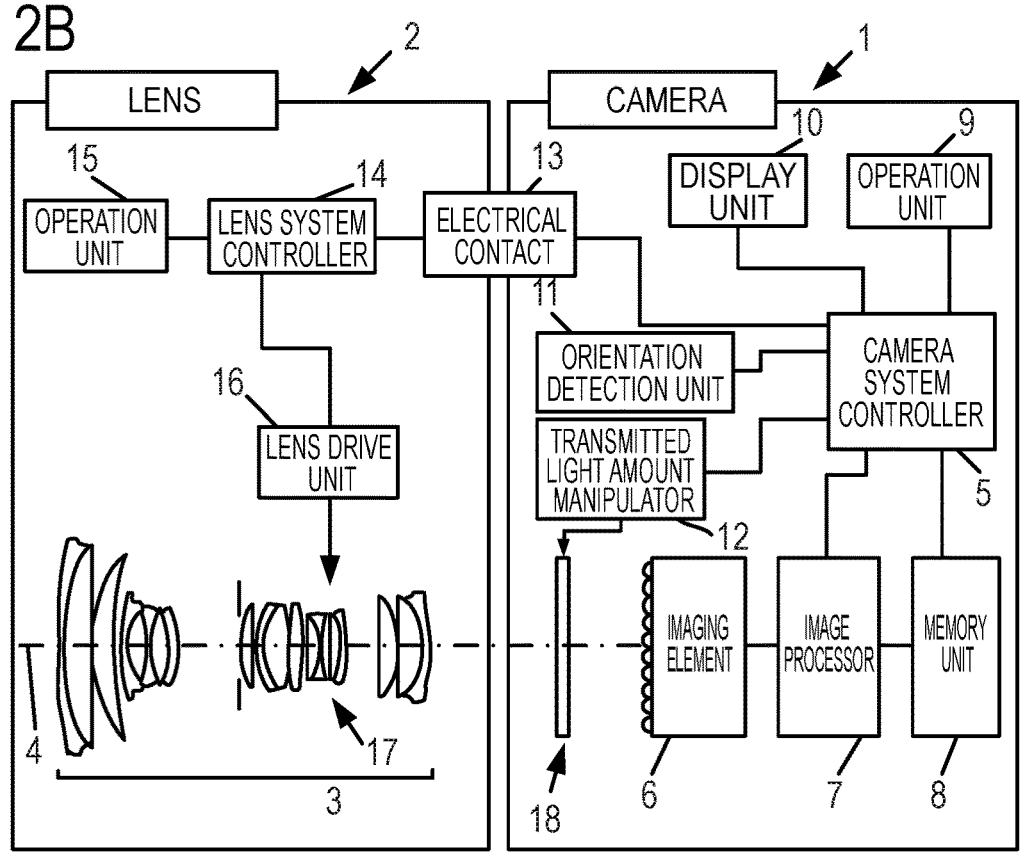

FIG. 1 is a perspective view of the imaging apparatus in which the EC device according to the first embodiment is used as a transmitted light amount variation unit. FIG. 2A is a central cross-sectional view of the imaging apparatus of FIG. 1, and FIG. 2B is a block diagram for illustrating an electrical configuration of the imaging apparatus of FIG. 1. In FIG. 2A, in a so-called "normal position" (direction (vertical direction) in which short sides of an imaging element are in a gravity direction, that is, a direction of gravity) of the imaging apparatus, a Y axis indicates the gravity direction, and a Z axis indicates an optical axis direction.

In FIG. 1, a lens barrel 2 is mounted to an imaging apparatus 1. An operation unit 9, which is used to operate the imaging apparatus 1, includes a so-called "shutter release button" 9a, which is connected to a release switch configured to detect a timing of photography. A lens barrel operation unit 15, which is used to operate the lens barrel 2, includes a zoom manipulator 15a configured to manipulate a focal length, and a focus manipulator 15b configured to manipulate a position of a focus lens.

In FIG. 2A, there are illustrated a photographing optical system 3, which is provided in the lens barrel 2 and consists of a plurality of lenses, an optical axis 4 of the photographing optical system 3, and an imaging element 6. Moreover, a display unit 10 includes a so-called "back display device" 10a, which is provided on the back of the imaging apparatus 1. There are also illustrated an electrical contact 13 between the imaging apparatus 1 and the lens barrel 2, a lens system controller 14 provided in the lens barrel 2, and a focus lens 17 configured to change a focus position of the lens barrel 2. There is further illustrated a transmitted light amount variation unit (EC device) 18. Details of the transmitted light amount variation unit 18 are described later. In a case of a lens-interchangeable imaging apparatus 1, the lens barrel 2 can be removed from the imaging apparatus 1. In the first embodiment, a case in which the transmitted light amount variation unit 18 is disposed in the imaging apparatus 1 is described, but the transmitted light amount variation unit 18 may be provided in the lens barrel 2. In that case, the transmitted light amount variation unit 18 may be disposed at any position as long as being incorporated somewhere in the photographing optical system 3.

In FIG. 2B, there are illustrated a camera system controller 5, an image processor 7, and a memory unit 8. There are also illustrated an orientation detection unit 11, which is configured to detect an orientation (orientation of the imaging apparatus 1) of an electrochromic element (EC element) forming the transmitted light amount variation unit 18, and a transmitted light amount manipulator 12, which is a drive unit configured to drive the transmitted light amount variation unit 18. There is further illustrated a lens drive unit 16 configured to drive the focus lens 17. Specific examples of the orientation detection unit 11 include an accelerometer and a gyro sensor, and the orientation detection unit 11 may be any sensor as long as the sensor can detect the orientation of the EC element forming the transmitted light amount variation unit 18, that is, the orientation (photographing orientation) of the imaging apparatus 1.

A camera system, which consists of the imaging apparatus 1 and the lens barrel 2, includes an imaging unit, an image processing unit, a recording/reproduction unit, and a controller. The imaging unit includes the photographing optical system 3 and the imaging element 6, and the image processing unit includes the image processor 7. Moreover, the recording/reproduction unit includes the memory unit 8 and the display unit 10 (the display unit 10 includes the back display device 10a, a small display panel (not shown), which is provided on an upper surface of the imaging apparatus 1 to display photographic information, and an electronic viewfinder (not shown), which is also called "EVF"). Similarly, the controller includes the camera system controller 5, the operation unit 9, the transmitted light amount manipulator 12, the lens system controller 14, and the lens drive unit 16. The lens drive unit 16 can drive the focus lens 17, a shake correction lens (not shown), a diaphragm, and the like.

The imaging unit is an optical processing system configured to form an image of light from an object on an imaging surface of the imaging element 6 through the photographing optical system 3. A focus evaluation amount and an appropriate exposure amount are obtained from the imaging element 6, and hence the photographing optical system 3 is adjusted appropriately based on signals indicating those amounts to expose the imaging element 6 with an appropriate amount of object light, and to form an object image in the vicinity of the imaging element 6.

The image processor 7 includes an A/D converter, a white balance adjustment circuit, a gamma correction circuit, an interpolation operation circuit, and the like inside thereof to be able to generate an image for recording. A color interpolation processing unit is included in the image processor 7, and performs color interpolation (demosaicing) processing based on a signal of a Bayer array to generate a color image. The image processor 7 is also configured to perform compression of an image, a moving image, audio, and the like by a predetermined method. The image processor 7 is further capable of generating a shake detection signal based on comparison among a plurality of obtained images from the imaging element 6, and the imaging element 6 and the image processor 7 may form a shake detection unit.

The memory unit 8 includes an actual storage device. The camera system controller 5 performs output to a recording device of the memory unit 8, and displays, on the display unit 10, an image to be presented to a user.

The camera system controller 5 is configured to generate and output a timing signal for photography and other such signals. The camera system controller 5 is configured to control each of an imaging system, an image processing system, and a recording/reproduction system in response to an external operation. For example, the camera system controller 5 detects pressing of the shutter release button 9a to control driving of the imaging element 6, operation of the image processor 7, compression processing, and the like. The camera system controller 5 is further configured to control a state of each segment of an information display device, which is configured to display information with the display unit 10. Moreover, the back display device 10a may be a touch panel, which serves as the display unit 10 and the operation unit 9.

Operation of adjusting an optical system by a control system is described. The camera system controller 5 is connected to the image processor 7 to determine an appropriate focus position and diaphragm position based on a signal from the imaging element 6. The camera system controller 5 issues an instruction to the lens system controller 14 via the electrical contact 13 such that the lens system controller 14 appropriately controls the lens drive unit 16. Further, when operating the transmitted light amount variation unit 18, which is provided in front of the imaging element 6, to change an amount of light that enters the imaging element 6, the camera system controller 5 appropriately operates the transmitted light amount manipulator 12 to change a transmitted light amount.

In the first embodiment, the transmitted light amount variation unit 18 is capable of manipulating a transmitted light amount of a so-called built-in ND filter, and represents an ND filter using the EC element. The transmitted light amount variation unit 18 is capable of changing the transmitted light amount depending on a user operation on a transmitted light amount manipulation unit (not shown), which is provided on the imaging apparatus 1 or the lens barrel 2, or changing the transmitted light amount based on exposure information obtained from the imaging element 6, for example.

<EC Device>

Figure 3A:
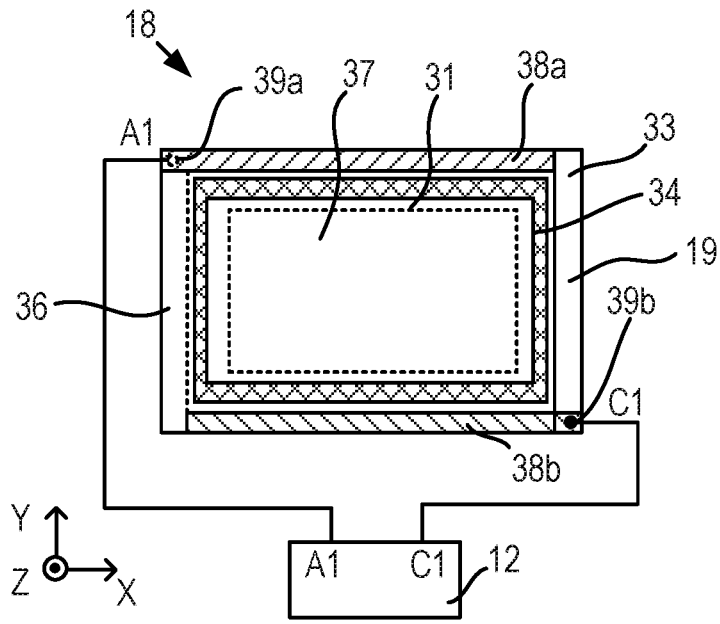
FIG. 3A, FIG. 3B, and FIG. 3C are views for illustrating an example of the EC device according to the first embodiment of the present invention.
Figure 3B:
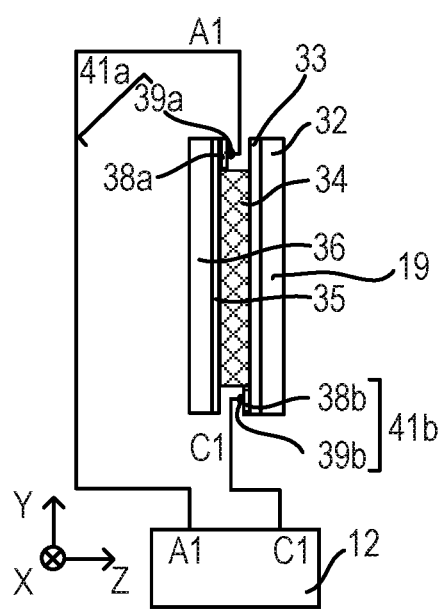
Figure 3C:
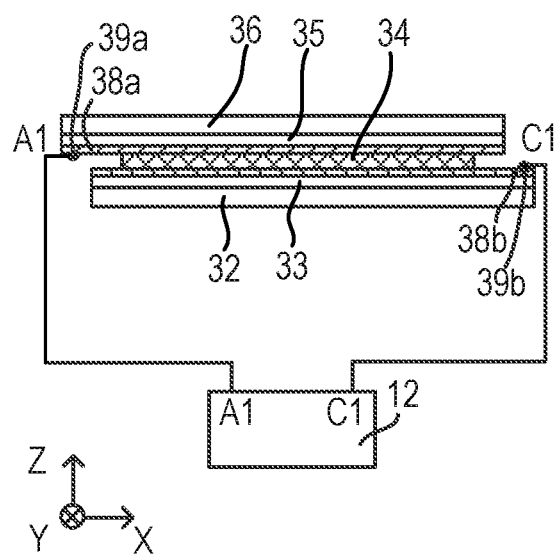

FIG. 3A to FIG. 3C are schematic views for illustrating an example of the EC device according to the first embodiment, which serves as the transmitted light amount variation unit 18 illustrated in FIG. 2A and FIG. 2B. In the example, a case is shown in which an external shape of an EC element 19, which forms the EC device 18, is a substantially rectangular shape. The term "substantially rectangular shape" includes a shape that has rounded corners but may be regarded substantially as a rectangle. FIG. 3A is a front view, FIG. 3B is a right-side view, and FIG. 3C is a bottom view. In FIG. 3A to FIG. 3C, as in FIG. 2A, in the so-called "normal position" (direction in which short sides of the imaging element 6 are in the gravity direction) of the imaging apparatus 1, the Y axis indicates the gravity direction, and the Z axis indicates the optical axis direction. In other words, the EC device 18 is fixed such that a long-side direction of the EC element 19 is set to an X axis, a short-side direction of the EC element 19 is set to the Y axis, and a thickness direction (stacking direction of electrodes) of the EC element 19 is set to the Z axis. When the imaging apparatus 1 is in a so-called "vertical position" (direction in which long sides of the imaging element 6 are in the gravity direction), the X axis indicates the gravity direction. Therefore, the gravity direction is changed between the Y axis and the X axis depending on the orientation of the EC element 19 (photographing orientation of the imaging apparatus 1). The case of the normal position, that is, the case in which the Y axis indicates the gravity direction, is basically described below.

Figure 12A:
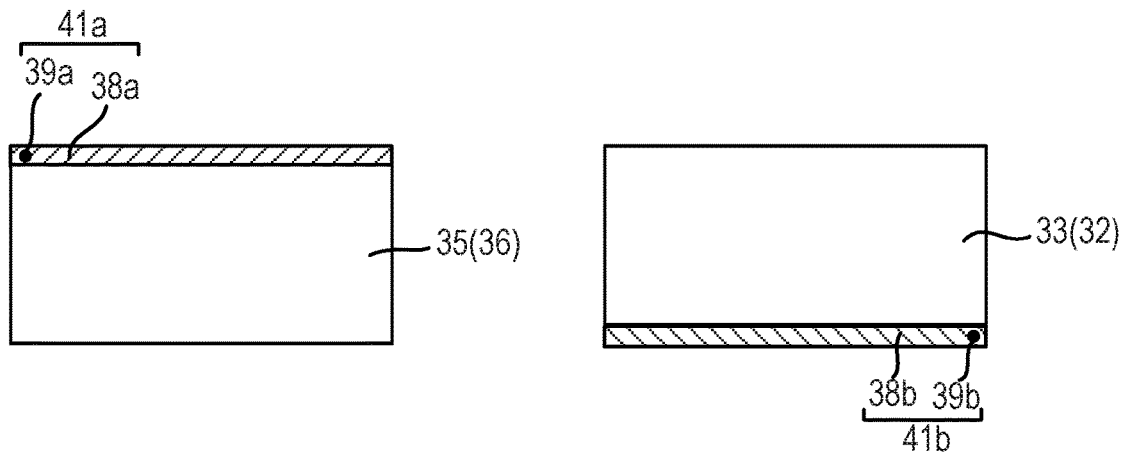
FIG. 12A, FIG. 12B, and FIG. 12C are plan views of electrode forming surface sides of substrates used in the embodiments.

In FIG. 3A to FIG. 3C, the EC device 18 includes an effective beam area 31, through which a photographic beam and the like pass, transparent substrates 32 and 36, and transparent electrodes 33 and 35, which are provided on the substrates 32 and 36, respectively. FIG. 12A is a plan view of electrode forming surface sides of the substrates 32 and 36 used in the first embodiment. As illustrated in FIG. 12A, the electrode 35 on the substrate 36 has formed thereon a power supply portion 41a consisting of a low-resistance wiring 38a, which is provided along one long side and has a resistance value that is lower than that of the electrode 35, and a power supply terminal 39a, which is provided at an end in the long-side direction of the low-resistance wiring 38a. Similarly, the electrode 33 on the substrate 32 has formed thereon a power supply portion 41b.

The substrates 32 and 36 are bonded together via a spacer 34 such that the electrodes 33 and 35 are opposed to each other and the power supply portions 41a and 41b are opposed to each other across the effective beam area 31. An electrochromic layer (EC layer) 37 is provided in a gap formed by the pair of electrodes 33 and 35 and the spacer 34 to form the EC element 19.

The power supply terminals 39a and 39b are connected to the transmitted light amount manipulator 12. For example, an alternating-current voltage or other such drive voltage is applied to the electrodes 33 and 35 via the transmitted light amount manipulator 12 through the power supply terminals 39a and 39b and the low-resistance wirings 38a and 38b, that is, the power supply portions 41a and 41b. It is preferred for the transmitted light amount manipulator 12 to at least include an arbitrary waveform generation circuit configured to generate a drive voltage waveform, and a relay or switch circuit configured to invert a polarity between the terminals, which are not shown. The transmitted light amount manipulator 12 may also include a power supply, a regulator, and other such peripheral devices. The transmitted light amount manipulator 12 may further include circuitry configured to measure an electric current or electric charges generated in an electrochemical reaction.

The EC layer 37 contains at least one kind of anodic electrochromic material (anodic EC material) and at least one kind of cathodic electrochromic material (cathodic EC material), preferably at least one kind of anodic organic EC material and at least one kind of cathodic organic EC material. When a voltage is applied between the electrodes 33 and 35, the EC materials cause electrochemical reactions. In general, the EC materials, for example, the organic EC materials, are in a neutral state under a state in which a voltage is not applied thereto, and do not show absorption in a visible light region. In such decolored state, the EC element 19 exhibits a high optical transmittance. When a voltage is applied between the electrodes 33 and 35, the EC materials cause electrochemical reactions to be converted from the neutral state to an oxidized state (cations) or a reduced state (anions). The EC materials show absorption in the visible light region in the form of cations or anions, to be colored. In such colored state, the EC element 19 exhibits a low optical transmittance. In addition, there is also used a material that forms a transparent dication structure in an initial state and forms radical species to be colored through one-electron reduction, like a viologen-based material.

In the following discussion, the optical transmittance of the EC element 19 is replaced with the absorbance of the EC element 19. The transmittance and the absorbance have a relationship of $-\log$ (transmittance)=(absorbance). Every time the transmittance is reduced to ½, the absorbance is increased by about 0.3.

[Substrates 32 and 36]

In the case of using the EC element 19 as a light control element, it is preferred that the EC element 19 keep a high transmittance in a decolored state in order to reduce an influence on an optical system. Therefore, the substrates 32 and 36 are each preferably a transparent substrate configured to sufficiently transmit visible light. A grass material is generally used, and an optical glass substrate, such as Corning #7059 or BK-7, may be preferably used. In addition, even a material such as plastic or ceramic may be appropriately used as long as the material has sufficient transparency. The substrates 32 and 36 are each preferably formed of a rigid material with less distortion. In addition, the substrates each more preferably have less flexibility. In general, the substrates 32 and 36 each have a thickness of from several tens of micrometers to several millimeters.

[Electrodes 33 and 35]

In the case of using the EC element 19 as a light control element, it is preferred that the EC element 19 keep a high transmittance in a decolored state in order to reduce an influence on an optical system. Therefore, the electrodes 33 and 35 are each preferably a transparent electrode configured to sufficiently transmit visible light. The electrodes 33 and 35 are each more preferably formed of a material having a high light transmitting property in a visible light region and high conductivity. Examples of a material for each of the electrodes 33 and 35 may include: metals and metal oxides, such as indium tin oxide alloy (ITO), tin oxide (NESA), indium zinc oxide (IZO), silver oxide, vanadium oxide, molybdenum oxide, gold, silver, platinum, copper, indium, and chromium; silicon-based materials, such as polycrystalline silicon and amorphous silicon; and carbon materials, such as carbon black, graphene, graphite, and glassy carbon. In addition, a conductive polymer having its conductivity improved through, for example, doping treatment (such as polyaniline, polypyrrole, polythiophene, polyacetylene, polyparaphenylene, or a complex of polyethylene dioxythiophene and polystyrene sulfonate (PEDOT:PSS)) is also suitably used. The EC element in the first embodiment preferably has a high transmittance in a decolored state, and hence, for example, ITO, IZO, NESA, PEDOT:PSS, or graphene is particularly preferably used. Those materials may be used in various forms, such as a bulk form and a fine particle form. Those electrode materials may be used alone or in combination thereof.

[EC Layer 37]

The EC layer 37 is preferably an EC layer in which an electrolyte and an organic EC material, such as a low-molecular weight organic material, are dissolved in a solvent.

The solvent is not particularly limited as long as the solvent can dissolve the electrolyte, but a polar solvent is particularly preferred. Specific examples thereof include water as well as organic polar solvents, such as methanol, ethanol, propylene carbonate, ethylene carbonate, dimethyl sulfoxide, dimethoxyethane, acetonitrile, γ-butyrolactone, γ-valerolactone, sulfolane, dimethylformamide, dimethoxyethane, tetrahydrofuran, acetonitrile, propionitrile, dimethylacetamide, methylpyrrolidinone, and dioxolane.

The electrolyte is not particularly limited as long as the electrolyte is an ion dissociative salt exhibiting satisfactory solubility and including a cation or anion having an electron-donating property to the extent that the coloration of the EC material can be ensured. Examples thereof include various inorganic ion salts, such as alkali metal salts and alkaline earth metal salts, quaternary ammonium salts, and cyclic quaternary ammonium salts. Specific examples thereof include: salts of alkali metals, such as Li, Na, and K, e.g., $LiClO_4$, $LiSCN$, $LiBF_4$, $LiAsF_6$, $LiCF_3SO_3$, $LiPF_6$, $LiI$, $NaI$, $NaSCN$, $NaClO_4$, $NaBF_4$, $NaAsF_6$, $KSCN$, and $KCl$; and quaternary ammonium salts and cyclic quaternary ammonium salts, such as $(CH_3)_4NBF_4$, $(C_2H_5)_4NBF_4$, $(n-C_4H_9)_4NBF_4$, $(C_2H_5)_4NBr$, $(C_2H_5)_4NClO_4$, and $(n-C_4H_9)_4NClO_4$. Generally known structures, such as $ClO_4^-$, $CF_3SO_3^-$, $BF_4^-$, $PF_6^-$, and $(CF_3SO_2)_2N^-$, are used as anionic species. In addition, an ionic liquid may also be used. Those electrolyte materials may be used alone or in combination thereof.

Any material may be used as the EC material as long as the material has solubility in the solvent and can express coloration and decoloration through an electrochemical reaction. A known EC material to be colored through oxidation/reduction may be used. In addition, a plurality of such materials may be used in combination. That is, the EC element 19 in the first embodiment may include a plurality of kinds of EC materials.

As a combination of the EC materials, an anodic material that shows coloration through an oxidation reaction and a cathodic material that shows coloration through a reduction reaction may be used in the following combinations: a combination of a single anodic material and a single cathodic material; a combination of a single anodic material and a plurality of cathodic materials; a combination of a plurality of anodic materials and a single cathodic material; and a combination of a plurality of anodic materials and a plurality of cathodic materials. Any one of the above-mentioned combinations may be adopted as the combination of the EC materials. Another anodic material or another cathodic material that does not exhibit EC characteristics may be included.

Specific examples of the EC materials may include: organic dyes, such as a viologen-based compound, a styryl-based compound, a fluoran-based compound, a cyanine-based compound, an anthraquinone-based compound, and an aromatic amine-based compound; and organometallic complexes, such as a metal-bipyridyl complex and a metal-phthalocyanine complex. The viologen-based compound can be used as a cathodic EC material, which is decolored in a stable dicationic state with a counter ion, and is colored due to a cationic state through a one-electron reduction reaction.

Examples of the anodic EC material include: thiophene derivatives; metallocene derivatives, such as ferrocene; aromatic amine derivatives, such as a phenazine derivative, a triphenylamine derivative, a phenothiazine derivative, and a phenoxazine derivative; pyrrole derivatives; and pyrazoline derivatives. However, the anodic EC material to be used in the first embodiment is not limited thereto.

Examples of the cathodic EC material include a viologen-based compound, an anthraquinone-based compound, a ferrocenium salt-based compound, and a styrylated compound. However, the cathodic EC material to be used in the first embodiment is not limited thereto.

In particular, in order to retain an absorption spectrum against a temperature change, it is preferred that any such material hardly form an association. When the material forms the association, the absorption of a monomer and the absorption of the association are superimposed in the absorption spectrum. The ease with which the association is formed changes with a temperature, and hence in such material, a ratio between the absorption of the monomer and the absorption of the association changes owing to a temperature change. A method involving arranging a bulky substituent to suppress the formation of the association by virtue of its steric hindrance is suitably used for avoiding the formation of the association.

The EC layer 37 is preferably a liquid or a gel. The EC layer 37 is suitably used in a solution state, but may also be used in a gel state as long as a speed of response is not significantly impaired. Gelling is carried out by further incorporating a polymer or a gelling agent into a solution. Examples of the polymer (gelling agent) include, but not particularly limited to, polyacrylonitrile, carboxymethylcellulose, polyvinyl chloride, polyvinyl bromide, polyethylene oxide, polypropylene oxide, polyurethane, polyacrylate, polymethacrylate, polyamide, polyacrylamide, polyester, polyvinylidene fluoride, and Nafion. Thus, the EC layer 37 may be used in a viscous state, a gel state, or the like. In addition, the EC layer 37 may be used under a state in which the solution is supported by a structural body having a transparent and flexible network structure (for example, a sponge-like one), other than in the mixed state as described above.

[Power Supply Portions 41a and 41b]

The power supply portion 41a consists of the low-resistance wiring 38a and the power supply terminal 39a, and the power supply portion 41b consists of the low-resistance wiring 38b and the power supply terminal 39b. The low-resistance wirings 38a and 38b are formed for the purpose of reducing an in-plane distribution of a voltage supplied from the power supply terminals 39a and 39b to the electrodes 33 and 35. When potential gradients are generated in planes of the electrodes 33 and 35 due to distances from the power supply terminals 39a and 39b, unevenness in electrochemical reaction amount is caused in a plane of the EC element 19. The electrochemical reaction of EC materials is more likely to occur on the power supply terminal side with a higher potential. Therefore, when the EC element 19 is driven under a state of a large potential distribution, reaction of the anodic EC material is unevenly distributed on an anode power supply terminal (positive electrode) side, and reaction of the cathodic EC material is unevenly distributed on a cathode power supply terminal (negative electrode) side. As a result, segregation due to the effect of the potential distribution occurs. In order to reduce the potential distribution within the effective beam area 31 as much as possible, it is preferred for the power supply terminals 39a and 39b to be placed on the long-side side and at positions opposed to each other across the effective beam area 31, that is, in regions in the vicinity of a diagonal of the electrodes 33 and 35, as with an A1 terminal and a C1 terminal in FIG. 3A to FIG. 3C.

Further, in order to suppress a potential drop in the long-side direction of the electrodes 33 and 35 at this time to about 10 mV and thus suppress the segregation due to the potential distribution in the long-side direction, it is preferred for the low-resistance wirings 38a and 38b to be placed along the long sides of the electrodes 33 and 35. Surface resistances of the low-resistance wirings 38a and 38b are preferably less than 1/100th, and more preferably less than 1/500th of resistances of the electrodes 33 and 35. As each of the low-resistance wirings 38a and 38b, a thin-film silver wiring formed by vacuum deposition, or a thick-film silver wiring formed by screen printing or inkjet coating can be suitably used.

<Drive Method>

Figure 4A:
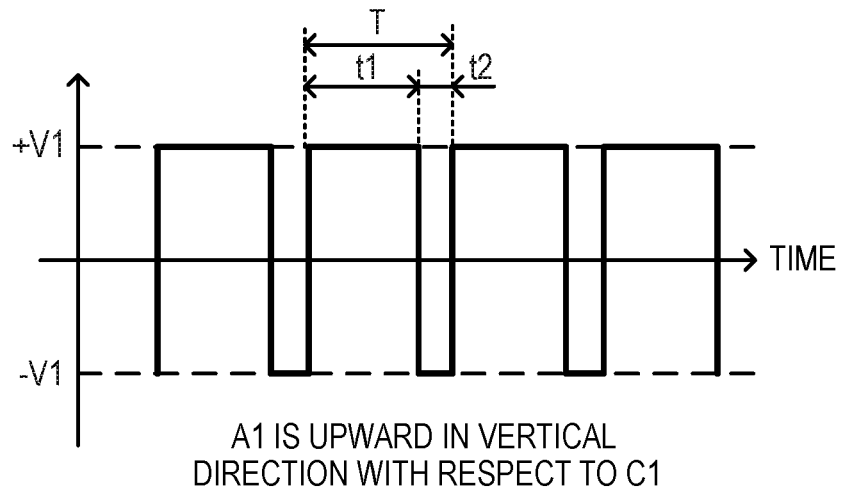
FIG. 4A and FIG. 4B are diagrams for illustrating an example of a method of driving the EC device according to the first embodiment of the present invention.
Figure 4B:
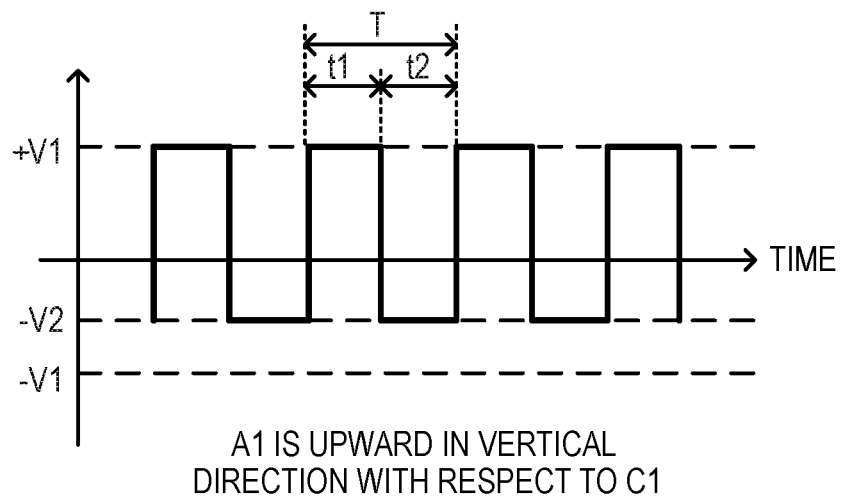

FIG. 4A and FIG. 4B are diagrams for illustrating an example of a drive control mode of the EC device according to the first embodiment. In FIG. 4A and FIG. 4B, there are illustrated applied voltage waveforms for a case in which the EC element 19 illustrated in FIG. 3A to FIG. 3C is driven while being held upright in the Y-axis direction, which is the gravity direction. In FIG. 3A to FIG. 3C, a −Y direction is the gravity direction, with the result that the A1 terminal side is defined as upward in the gravity direction, and the C1 terminal side is defined as downward in the gravity direction. Of the A1 terminal and the C1 terminal, the C1 terminal is connected to the ground, and hence applied voltages +V1 and −V1 express the polarity of the A1 terminal. The applied voltage +V1 causes an anodic reaction on the A1 terminal side and a cathodic reaction on the C1 terminal side, and hence causes coloring. In contrast, the applied voltage −V1 causes a cathodic reaction on the A1 terminal side and an anodic reaction on the C1 terminal side, and hence causes coloring.

When only the applied voltage −V1 is applied continuously as the applied voltage, the segregation due to the effect of the potential distribution occurs predominantly, with the result that anions are unevenly distributed on the A1 terminal side (upward in the gravity direction), and cations are unevenly distributed on the C1 terminal side (downward in the gravity direction). Further, the above-mentioned effect of the specific gravities is applied with a delay, with the result that the anions are moved upward in the gravity direction, and the cations are moved downward in the gravity direction, to thereby further increase the segregation with superimposition of both effects. Meanwhile, when only the applied voltage +V1 is applied continuously as the applied voltage, the segregation due to the effect of the potential distribution causes cations to be unevenly distributed on the A1 terminal side, and anions to be unevenly distributed on the C1 terminal side. In addition, the effect of the specific gravities causes the anions to be moved upward in the gravity direction, and the cations to be moved downward in the gravity direction. When the cations and the anions collide with each other, a radical state returns to an initial state through exchange of electric charges to cause decoloring. Therefore, as compared to a case in which the applied voltage −V1 is applied continuously, the segregation of the EC materials in the gravity direction is reduced. However, with the segregation due to the effect of the potential distribution being predominant, as opposed to the case in which the applied voltage −V1 is applied, the cations are unevenly distributed upward in the gravity direction, and the anions are unevenly distributed downward in the gravity direction.

In the drive control mode in the first embodiment, as illustrated in FIG. 4A, the applied voltages +V1 and −V1 are applied alternately, and time widths in which the applied voltages +V1 and −V1 are applied are controlled to adjust the segregation due to the effect of the potential distribution, and adjust cancellation by segregation due to the specific gravities. An application time period t1 of the applied voltage +V1 and an application time period t2 of the applied voltage −V1 are defined as one cycle T, and a ratio between the time periods is controlled such that a reaction amount of the anodic EC material is controlled to become relatively larger than a reaction amount of the cathodic EC material on the A1 terminal side (upward in the gravity direction). Stated differently, the control is equivalent to controlling the reaction amount of the anodic EC material on the A1 terminal side (upward in the gravity direction) to become relatively larger than a reaction amount of the anodic EC material on the C1 terminal side (downward in the gravity direction). Moreover, the reaction amounts of the EC materials can be estimated based on a charge amount measured by the electrochemical reaction. Further, the alternate application of the applied voltages +V1 and −V1 to the A1 terminal (upward in the gravity direction) and the C1 terminal (downward in the gravity direction) is equivalent to switching the power supply terminals provided upward in the gravity direction and downward in the gravity direction alternately to a positive electrode. Performing control as described above corresponds to controlling an amount of charge that is generated when the power supply terminal located upward in the gravity direction is switched to the positive electrode to become larger than an amount of charge that is generated when the power supply terminal located downward in the gravity direction is switched to the positive electrode. The charge amount may be estimated by the transmitted light amount manipulator 12 measuring an electric current per unit time and calculating the charge amount based on summation of the electric currents.

Moreover, instead of the time widths, peak values of the voltages may be controlled as illustrated in FIG. 4B to adjust the segregation due to the effect of the potential distribution. In this case, for example, an applied voltage −V2, which is smaller in absolute value than the applied voltage −V1, is applied in the application time period t2. The reaction amounts of the electrochemical reaction depend on a magnitude of the drive voltage, and hence the applied voltages V1 and V2 are controlled to control the reaction amount of the anodic EC material to become relatively larger than the reaction amount of the cathodic EC material on the A1 terminal side (upward in the gravity direction). Moreover, control can be performed suitably with both the time widths and the peak values of the voltages.

Moreover, when an absorbance, that is, a gradation, of coloring of the EC element 19 is to be controlled, such adjustment can be made by adjusting the ratio between the time periods t1 and t2, adjusting a ratio between the applied voltages V1 and V2, or adjusting both the time widths and the peak values of the voltages. Alternatively, the adjustment can be made by a method of intermittently applying the applied voltage during the time period t1 or t2.

Further, the EC device may include a drive time detection unit, which is configured to detect drive time, for example, time during which the power supply portions drive the EC device at the same potential, to change control depending on the drive time. In general, the EC element is colored when driven, and as the drive time becomes longer, separation between the anions and the cations proceeds, and the time it takes for decoloring also becomes longer. Therefore, control may be performed to monitor the drive time and change time intervals during which the voltages are applied (balance between the time periods t1 and t2), for example.

When the application time periods t1 and t2 are long, the absorbance of the EC element 19 fluctuates at timings of switching from the time period t1 to the time period t2, and from the time period t2 to the time period t1. Therefore, in order to suppress the change in absorbance of the EC element 19 at the time when being driven to be colored, a time width of one cycle T is preferably 0.1 Hz or less, more preferably 1 Hz or less, and further preferably 10 Hz or less.

The above description has been made with the −Y direction in FIG. 3A to FIG. 3C being the gravity direction. However, when the imaging apparatus 1 is used in various orientations by the user, the EC element 19 is also used in various orientations. In other words, the gravity direction is changed depending on the orientation (photographing orientation) of the EC element 19. In view of such circumstances, in order to reduce the segregation in any orientation, in the first embodiment, operations of the power supply portions are controlled depending on the orientation detected by the orientation detection unit 11, which is configured to detect the orientation of the EC element 19. For example, operations of the power supply portions in a case where a +Y direction is the gravity direction are as illustrated in FIG. 5A and FIG. 5B.

Figure 5A:
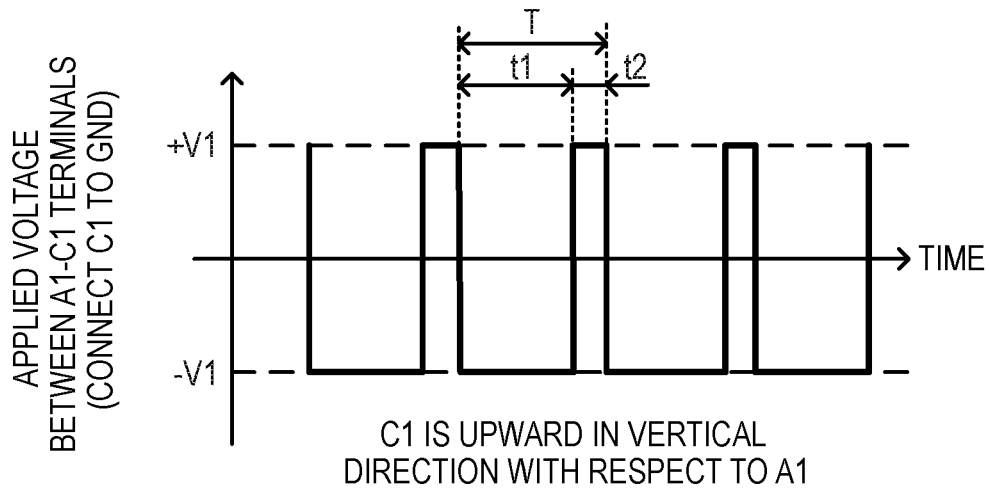
FIG. 5A and FIG. 5B are diagrams for illustrating another example of the method of driving the EC device according to the first embodiment of the present invention.

In FIG. 5A, there is illustrated a control method in which the time widths in which the voltages are applied are controlled as in FIG. 4A to adjust the segregation due to the effect of the potential distribution. The gravity direction is turned upside down from that in the case of FIG. 4A, and hence control is performed such that a time period in which the applied voltage −V1 is applied to the A1 terminal becomes longer. In this manner, the reaction amount of the anodic EC material is controlled to become relatively larger than the reaction amount of the cathodic EC material on the C1 terminal side (upward in the gravity direction). In other words, the control is equivalent to controlling the reaction amount of the anodic EC material on the C1 terminal side (upward in the gravity direction) to become relatively larger than the reaction amount of the anodic EC material on the A1 terminal side (downward in the gravity direction). Through such control, the effect of the segregation due to the specific gravities can be canceled through use of the segregation due to the effect of the potential distribution.

Figure 5B:
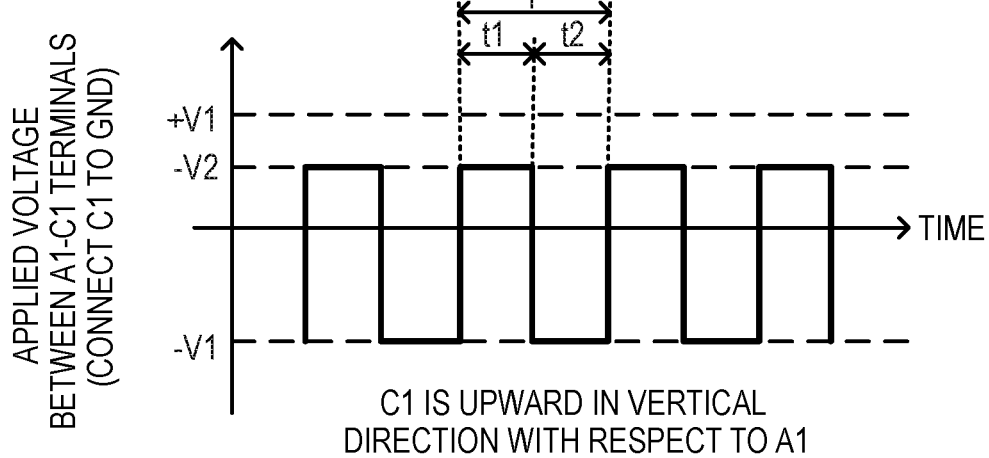

Moreover, as in the case of FIG. 4B, the peak values of the voltages may be controlled as in FIG. 5B to adjust the segregation due to the effect of the potential distribution. In FIG. 5B, as opposed to FIG. 4B, through reduction of the applied voltage +V to be applied to the A1 terminal, the reaction amount of the anodic EC material on the C1 terminal side (upward in the gravity direction) can be controlled to become relatively larger. Through such control, the effect of the segregation due to the specific gravities can be canceled through use of the segregation due to the effect of the potential distribution.

When the gravity direction is the Z-axis direction (direction perpendicular to the drawing sheet), the effect of the segregation due to the specific gravities is small, and hence only the effect of the potential distribution may be reduced by changing the direction of the potential to be applied to the power supply portions at predetermined time intervals, for example. In other words, in the case where the widths (t1 and t2) of the time periods in which the voltages are applied are controlled as in FIG. 4A, for example, it is preferred to perform control such that the application time period and a non-application time period are equal to each other (t1=t2). The case in which the gravity direction is the Z-axis direction is common for all embodiments to be described later, and hence a detailed description thereof is omitted in the following embodiments.

Moreover, when the gravity direction is between the Z axis and the Y axis, that is, the gravity direction is on a YZ plane, it is preferred to change a drive method in accordance with an inclination of the YZ plane. For example, when the imaging apparatus 1 is inclined diagonally upward toward the sky above to photograph the sky, or when the imaging apparatus 1 is inclined diagonally downward toward the ground to photograph the ground, the gravity direction is on the YZ plane. For example, when the application time periods for the power supply terminals 39a and 39b are controlled as in FIG. 4A, the application time periods are controlled such that t1=t2 when the gravity direction is parallel to the Z axis, but as the imaging apparatus 1 is inclined more in the Y-axis direction, the application time periods are controlled such that the time period t1 becomes gradually longer than the time period t2. The case in which the gravity direction is between the Z axis and the Y axis is common for all embodiments to be described later, and hence a detailed description thereof is omitted in the following embodiments.

As described above, with the change in control of the power supply portions as illustrated in FIG. 4A and FIG. 4B, and FIG. 5A and FIG. 5B depending on the output of the orientation detection unit 11, the effect of the segregation can be reduced irrespective of the orientation of the EC element 19. Further, when the EC device is used for a long time, unevenness and a change in absorption spectrum of the EC element can be reduced.

What is described in the present invention is to make, in the EC element 19, a generation amount of cations that are generated on the side of the terminal located upward in the gravity direction relatively larger than a generation amount of cations that are generated on the side of the terminal located downward in the gravity direction depending on the output of the orientation detection unit 11. This is for the purpose of effectively using the segregation due to the effect of the potential distribution to cancel the segregation due to the effect of the specific gravities. The first embodiment has been described through use of the structure of the EC element 19 illustrated in FIG. 3A to FIG. 3C, and the drive control methods of FIG. 4A to FIG. 5B. However, another structure or drive method may be used as long as the method involves unevenly distributing substances having different specific gravities in the EC element 19 to cancel the effect of the segregation due to the specific gravities. For example, there may be employed an EC element in which the electrodes each have a shape other than the rectangular shape, for example, a substantially elliptical shape, or an EC element having the following magnitude relationship of specific gravities: anions>solvent>cations.

Second Embodiment

Next, another embodiment of the present invention is described with reference to FIG. 6A to FIG. 8B and FIG. 12B. A basic configuration is similar to that of the first embodiment, and hence parts different from those of the first embodiment are described.

<EC Device>

Figure 6A:
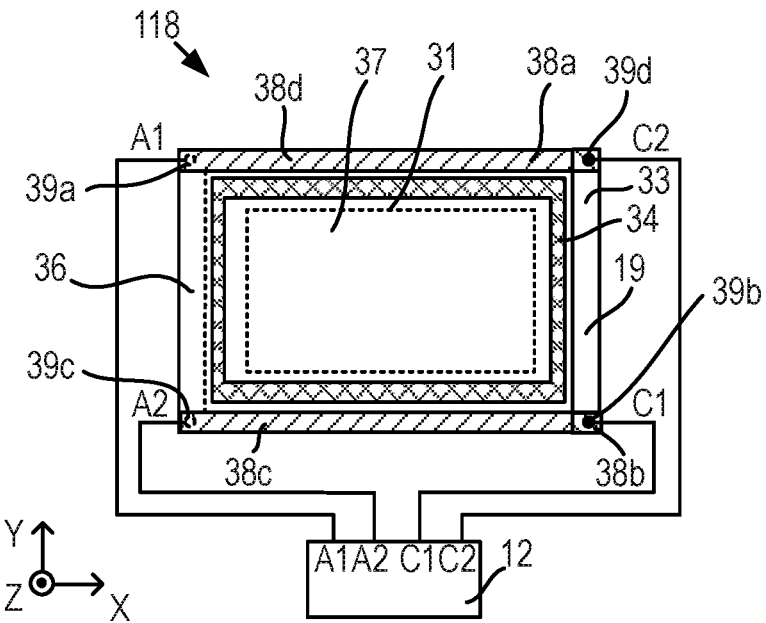
FIG. 6A and FIG. 6B are views for illustrating an example of an EC device according to a second embodiment of the present invention.
Figure 6B:
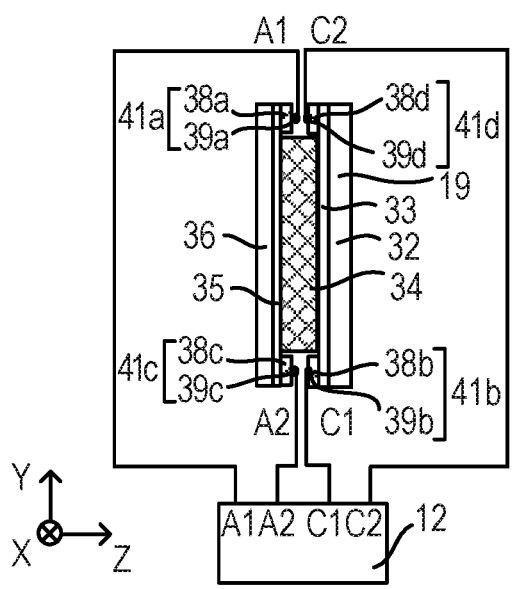

FIG. 6A and FIG. 6B are schematic views for illustrating an EC device 118 according to a second embodiment of the present invention, FIG. 6A is a front view, and FIG. 6B is a right-side view. Moreover, FIG. 12B is a plan view of electrode forming surface sides of the substrates 32 and 36 used in the second embodiment.

Figure 12B:
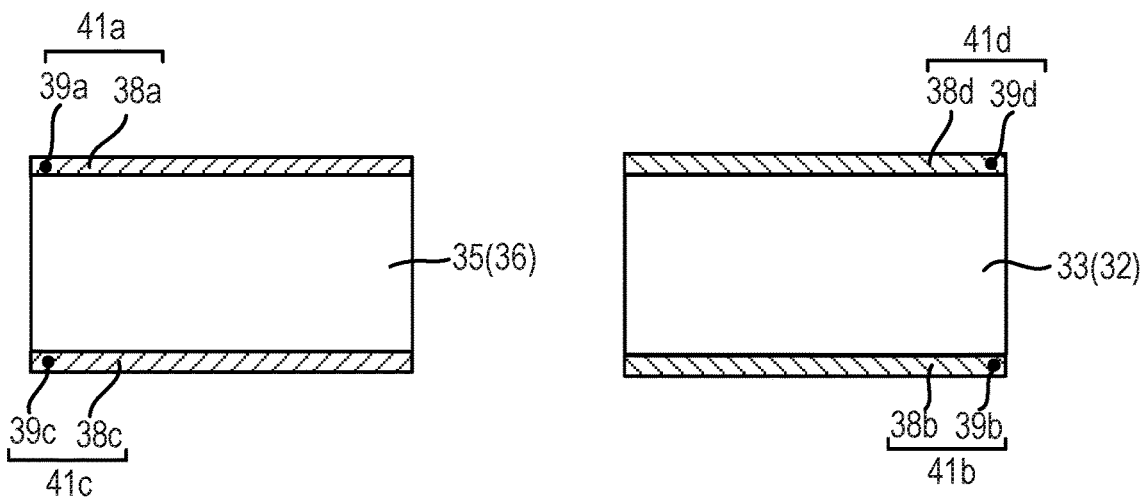

As illustrated in FIG. 12B, the electrode 35 on the substrate 36 has formed thereon power supply portions 41a and 41c. The power supply portions 41a and 41c consist of low-resistance wirings 38a and 38c, which are respectively provided along the long sides of the electrode 35 across the effective beam area 31, and power supply terminals 39a and 39c, which are respectively provided at ends on the same side in the long-side direction of the low-resistance wirings 38a and 38c. Similarly, the electrode 33 on the substrate 32 has formed thereon power supply portions 41b and 41d.

Next, reasons why the second embodiment is more preferable than the first embodiment are described. When the coloring operation is continued while only a pair of power supply terminals (for example, A1 terminal (anode) and C1 terminal (cathode)) is selected as in the first embodiment, there are cases in which it is difficult to avoid the segregation due to the effect of the potential distribution. In this case, the anode material may be strongly colored in the vicinity of the power supply portion 41a (A1 terminal and low-resistance wiring 38a), and the cathode material may be strongly colored in the vicinity of the power supply portion 41b (C1 terminal and low-resistance wiring 38b). The segregation due to the effect of the potential distribution tends to occur earlier and stronger than the segregation in the gravity direction due to specific gravities of the EC materials.

In view of the above-mentioned circumstances, in the second embodiment, A2 and C2 terminals are placed at positions respectively opposed to the A1 and C1 terminals across the effective beam area 31. Specifically, the A2 and C2 terminals are placed in regions in the vicinity of a diagonal that is different from the diagonal of the electrodes 33 and 35 on which the A1 and C1 terminals are disposed. Then, voltage pulses may be applied sequentially between the pairs of power supply terminals, that is, between the A1-C1 terminals and between the A2-C2 terminals, to thereby suppress occurrence of segregation in the vicinity of the power supply portions 41a to 41d while applying the same voltage between the electrodes 33 and 35.

In other words, in addition to the existing A1 and C1 terminals, the A2 and C2 terminals are placed at positions at which the segregation due to the effect of the potential distribution is canceled, and the voltage pulses are applied sequentially between the A1-C1 terminals and the A2-C2 terminals to suppress the occurrence of the segregation.

<Drive Method>

[Case in which Gravity Direction is −Y Direction]

Next, drive control methods in a case where the voltage pulses are applied sequentially between the A1-C1 terminals and between the A2-C2 terminals are described with reference to FIG. 7A and FIG. 7B.

Figure 7A:
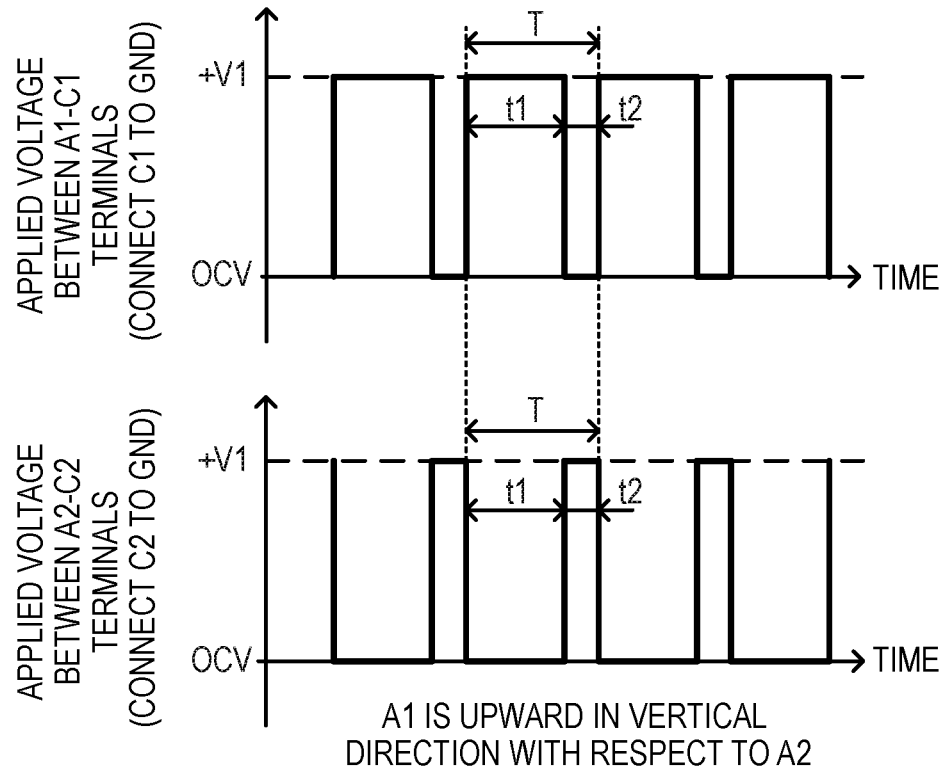
FIG. 7A and FIG. 7B are diagrams for illustrating an example of a method of driving the EC device according to the second embodiment of the present invention.
Figure 7B:
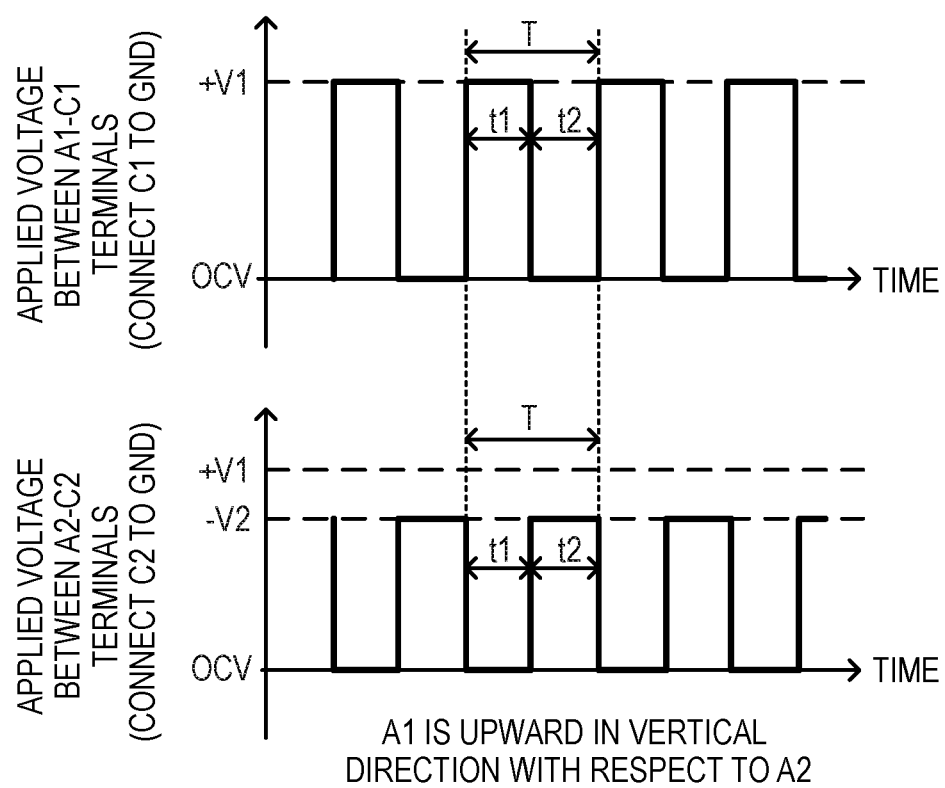

FIG. 7A and FIG. 7B are diagrams for illustrating an example of a drive control mode of the EC device according to the second embodiment. In FIG. 7A and FIG. 7B, there are illustrated applied voltage waveforms for a case in which the EC element 19 is driven while being held upright in the Y-axis direction, which is the gravity direction, as in FIG. 4A and FIG. 4B. In FIG. 6A and FIG. 6B, the −Y direction is the gravity direction, with the result that the side of the A1 and C2 terminals is defined as upward in the gravity direction, and the side of the A2 and C1 terminals is defined as downward in the gravity direction. Of the A1-C1 terminals, the C1 terminal is connected to the ground, and of the A2-C2 terminals, the C2 terminal is connected to the ground. The applied voltage +V1 means that voltages of the same polarity are applied to the A1 and A2 terminals. In the second embodiment, as seen in FIG. 7A, voltage waveforms of opposite phases are applied between the A1-C1 terminals and between the A2-C2 terminals. A drive waveform between the A1-C1 terminals applies the voltage +V1 during the time period t1, and holds an open circuit voltage (OCV) during the time period t2. Setting the open circuit voltage means breaking the electrical contact between a drive source side and the A1-C1 terminals, or inserting a high resistor to interrupt the electric current. Specifically, a switching element, for example, a relay or a transistor, is set to be conductive during the time period t1, and to be non-conductive during the time period t2. The coloring reaction occurs during the time period t1 in which the voltage +V1 is applied, and the coloring reaction does not occur during the time period t2 in which the OCV is held.

A voltage waveform of the opposite phase to that between the A1-C1 terminals is applied between the A2-C2 terminals, with the result that the OCV is held during the time period t1, and the voltage +V1 is applied during the time period t2. The voltage +V1 is applied alternately between the A1 and A2 terminals, with the result that the voltage of the EC element 19 does not drop, and the direction of the potential distribution is switched alternately, with the result that the segregation due to the effect of the potential distribution can be reduced. To describe more specifically, cations are generated on the A1 terminal side and anions are generated on the C1 terminal side during the time period t1, and cations are generated on the A2 terminal side and anions are generated on the C2 terminal side during the time period t2. Therefore, the cations and anions unevenly distributed between the A1 and C2 terminals are decolored through the exchange of electric charges, and the cations and anions unevenly distributed between the A2 and C1 terminals are similarly decolored through the exchange of electric charges. As a result, the segregation due to the effect of the potential distribution is further suppressed.

When the values of the time periods t1 and t2 are equal to each other, densities of the cations and anions generated between the A1 and C2 terminals and between the A2 and C1 terminals are closest to each other, and hence the segregation due to the effect of the potential distribution is most suppressed. However, when the effect of the specific gravities is added thereto, the cations and anions formed in the element plane are gradually moved. Eventually, the anions are unevenly distributed upward in the gravity direction, and the cations are unevenly distributed downward in the gravity direction. In the drive control mode in the second embodiment, the time widths t1 and t2 are controlled as illustrated in FIG. 7A to adjust the segregation due to the effect of the potential distribution, and to adjust cancellation by the segregation due to the specific gravities. The EC element 19 is held upright in the gravity direction, and hence the A1 terminal is located above the A2 terminal in the gravity direction. The time width t1 of the coloring reaction on the A1 terminal side may be set relatively larger than the time width t2 of the coloring reaction on the A2 terminal side to control the uneven distribution of the cations due to the effect of the potential distribution to be predominant on the A1 terminal side.

Moreover, instead of the time widths, the peak values of the voltages may be controlled as illustrated in FIG. 7B to adjust the segregation due to the effect of the potential distribution of the A1 and A2 terminals. In this case, for example, a voltage +V2, which is smaller in absolute value than the voltage +V1, is applied in the application time period t2. The reaction amounts of the electrochemical reaction depend on the magnitude of the drive voltage, and hence the voltages V1 and V2 may be controlled to control the uneven distribution of the cations due to the effect of the potential distribution to be predominant on the A1 terminal side. Moreover, control can be performed suitably with both the time widths and the peak values of the voltages.

Moreover, when the absorbance, that is, the gradation, of coloring of the EC element 19 is to be controlled, such adjustment can be made by adjusting the ratio between the time periods t1 and t2, adjusting the ratio between the voltages V1 and V2, or adjusting both the time widths and the peak values of the voltages. Alternatively, the adjustment can be made by a method of intermittently applying the applied voltage during the time period t1 or t2.

When the application time periods t1 and t2 are long, the absorbance of the EC element 19 fluctuates at timings of switching from the time period t1 to the time period t2, and from the time period t2 to the time period t1. Therefore, in order to suppress the change in absorbance of the EC element 19 at the time when being driven to be colored, a time width of one cycle T is preferably 0.1 Hz or less, more preferably 1 Hz or less, and further preferably 10 Hz or less.

Next, a case in which the gravity direction is changed is described. In FIG. 7A and FIG. 7B, the description has been made with the −Y direction in FIG. 6A and FIG. 6B being the gravity direction. However, as described in the first embodiment, the gravity direction is changed depending on the orientation (photographing orientation) of the EC element 19, and hence operations of the power supply portions are controlled depending on the orientation detected by the orientation detection unit 11, which is configured to detect the orientation of the EC element 19. For example, operations of the power supply portions in a case where the +Y direction in FIG. 6A and FIG. 6B is the gravity direction are as illustrated in FIG. 8A and FIG. 8B.

Figure 8A:
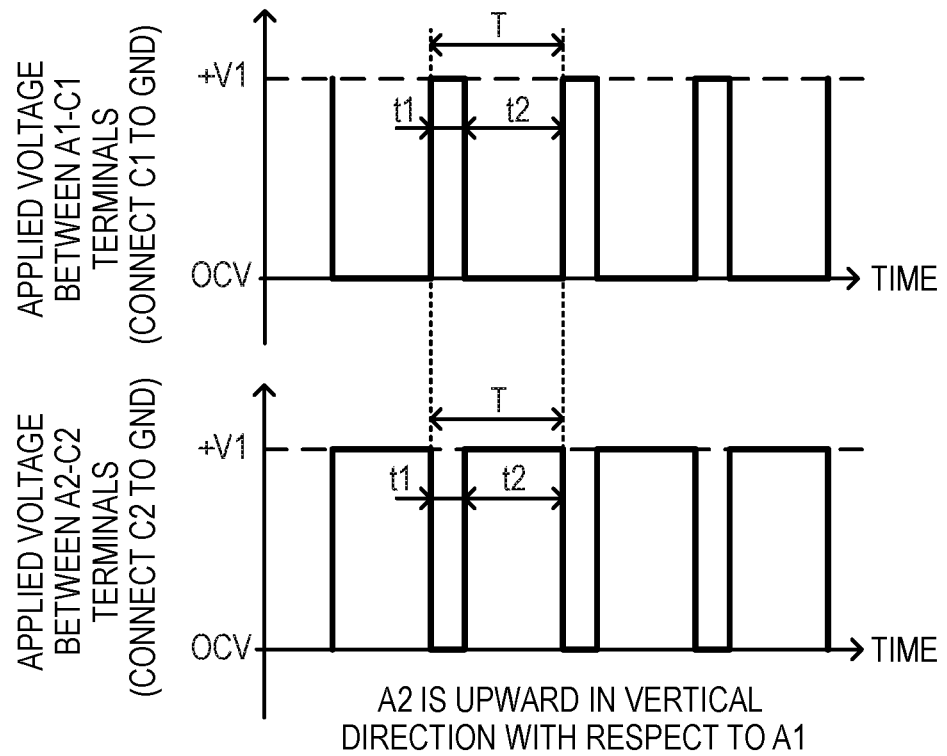
FIG. 8A and FIG. 8B are diagrams for illustrating another example of the method of driving the EC device according to the second embodiment of the present invention.

In FIG. 8A, there is illustrated a control method in which the time widths in which the voltages are applied are controlled as in FIG. 7A to adjust the segregation due to the effect of the potential distribution. In FIG. 8A, the gravity direction is turned upside down from that in the case of FIG. 7A, and hence control is performed such that the time period (t1) in which the voltage +V1 is applied to the A1 terminal becomes shorter. At the same time, control is performed such that the time period (t2) in which the voltage +V1 is applied to the A2 terminal, to which a voltage of the opposite phase is applied, becomes longer. In this manner, the reaction amount of the anodic EC material is controlled to become relatively larger than the reaction amount of the cathodic EC material on the side of the C1 and A2 terminals (upward in the gravity direction). In other words, the control is equivalent to controlling the reaction amount of the anodic EC material on the side of the C1 and A2 terminals (upward in the gravity direction) to become relatively larger than the reaction amount of the anodic EC material on the side of the A1 and C2 terminals (downward in the gravity direction). Through such control, the effect of the segregation due to the specific gravities can be canceled through use of the segregation due to the effect of the potential distribution.

Figure 8B:
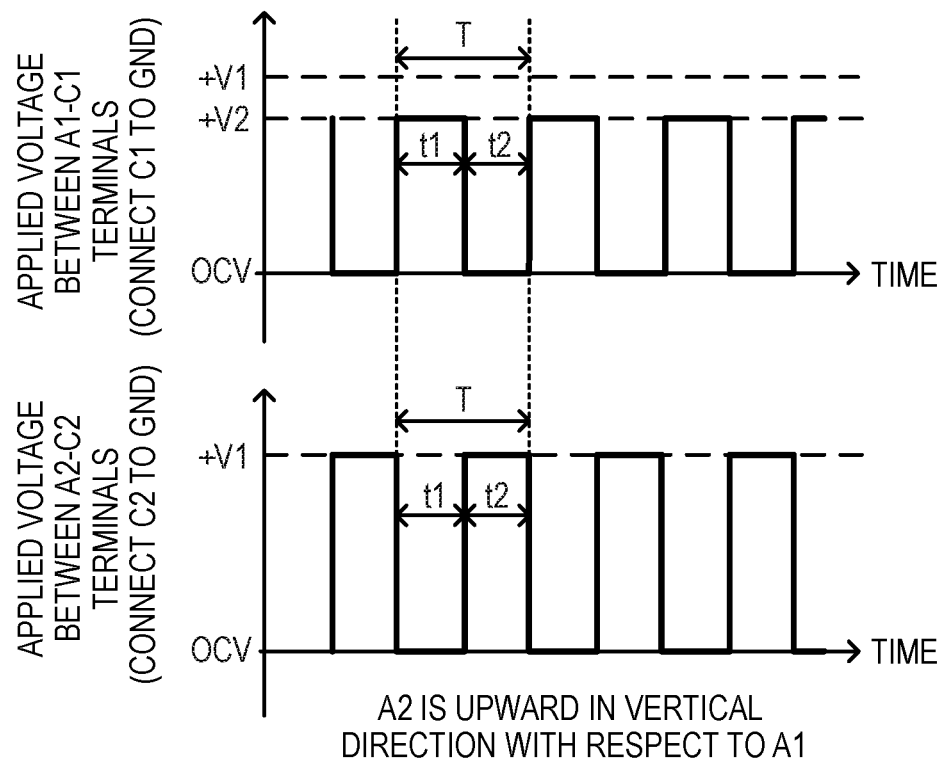

Moreover, as in the case of FIG. 7B, the peak values of the voltages may be controlled as in FIG. 8B to adjust the segregation due to the effect of the potential distribution. In FIG. 8B, as opposed to FIG. 7B, as the voltage to be applied to the A1 terminal side (downward in the gravity direction) in the application time period t1, the voltage +V2, which is smaller in absolute value than the voltage +V1, is applied. Meanwhile, in the application time period t2, the voltage to be applied to the A2 terminal side (upward in the gravity direction) is +V1. The reaction amounts of the electrochemical reaction depend on the magnitude of the drive voltage, and hence the voltages V1 and V2 may be controlled to control the uneven distribution of the cations due to the effect of the potential distribution to be predominant on the A2 terminal side. Through such control, the effect of the segregation due to the specific gravities can be canceled through use of the segregation due to the effect of the potential distribution.

As described above, with the change in control of the power supply portions as illustrated in FIG. 7A and FIG. 7B and FIG. 8A and FIG. 8B depending on the output from the orientation detection unit 11, the effect of the segregation can be reduced irrespective of the orientation of the EC element 19.

Third Embodiment

Still another embodiment of the present invention is described with reference to FIG. 9A to FIG. 9C and FIG. 12C. A basic configuration is similar to that of the second embodiment, and hence parts different from those of the second embodiment are described.

<EC Device>

Figure 9A:
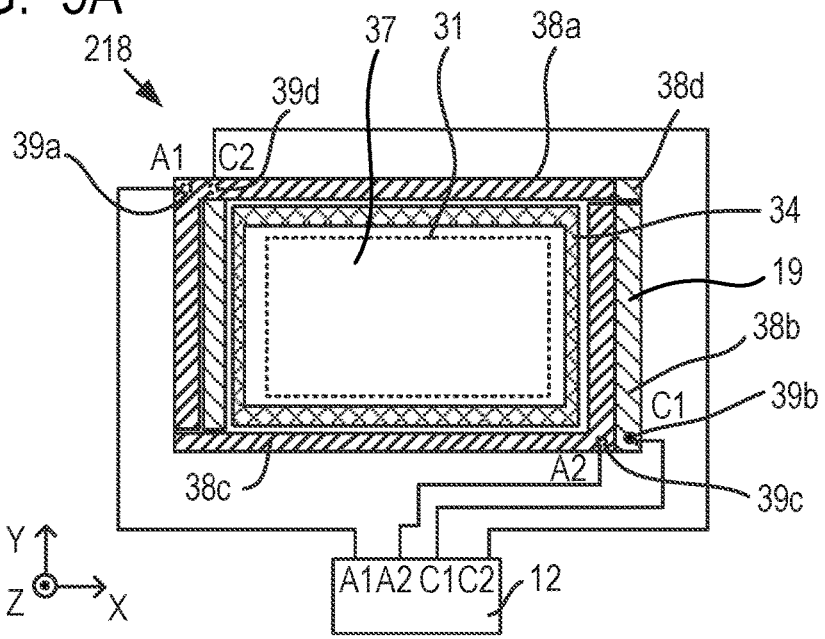
FIG. 9A, FIG. 9B, and FIG. 9C are views for illustrating an example of an EC device according to a third embodiment of the present invention.
Figure 9B:
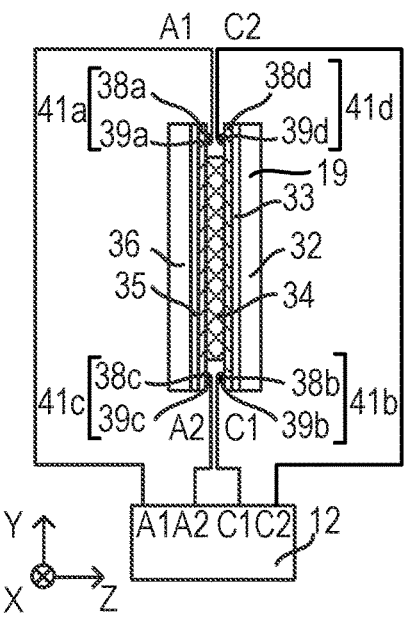
Figure 9C:
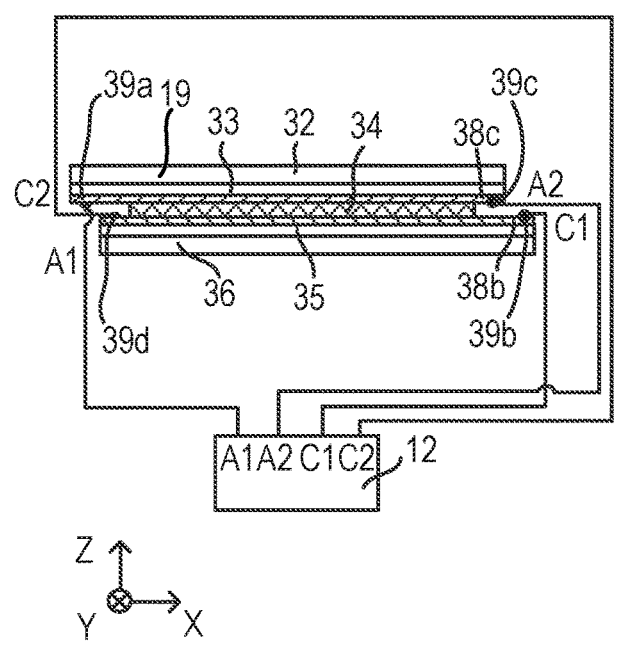

FIG. 9A to FIG. 9C are schematic views for illustrating an EC device 218 according to a third embodiment of the present invention, FIG. 9A is a front view, FIG. 9B is a right-side view, and FIG. 9C is a bottom view. Moreover, FIG. 12C is a plan view of electrode forming surface sides of the substrates 32 and 36 used in the third embodiment.

Figure 12C:
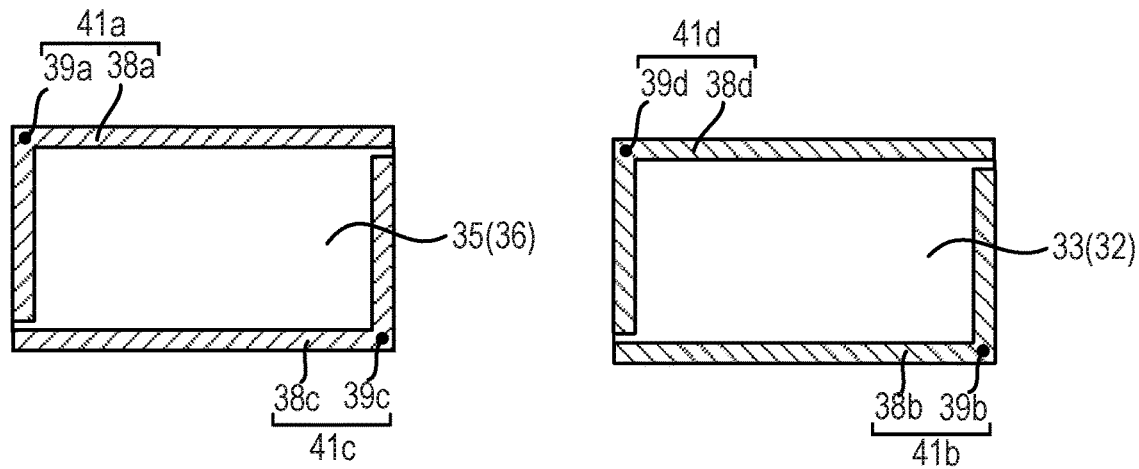

The third embodiment is different from the second embodiment in that, as illustrated in FIG. 12C, each of the low-resistance wirings 38a to 38d has an L shape, and is provided continuously along one long side and one short side of the electrodes 33 and 35. Moreover, the power supply terminals 39a to 39d are provided in corners of the low-resistance wirings 38a to 38d, respectively. With such disposition, as in the case where the imaging apparatus 1 is held in the so-called "vertical position", for example, the effect of the segregation due to the specific gravities can be reduced even when the EC element 19 is in the orientation in which the X-axis direction is the gravity direction.

In FIG. 9A to FIG. 9C, the low-resistance wirings 38a to 38d are provided also along the short sides of the electrodes 33 and 35, and hence even when the gravity direction is the long-side direction (that is, X-axis direction) of the electrodes 33 and 35 (EC element 19), power supply portions are provided upward and downward in the gravity direction. Therefore, as described in the first embodiment and the second embodiment, the power supply portions may be controlled depending on the output from the orientation detection unit 11 to cancel the effect of the segregation due to the specific gravities through use of the segregation due to the potential distribution.

<Drive Method>

For example, the power supply portions may be controlled as in FIG. 7A and FIG. 7B when the −Y direction or a +X direction is the gravity direction, and as in FIG. 8A and FIG. 8B when the +Y direction or a −X direction is the gravity direction to cancel the effect of the segregation due to the specific gravities.

Moreover, even when the gravity direction is inclined, that is, when the gravity direction is inclined on an XY plane, the power supply portions may be controlled similarly to achieve similar effects. For example, when the gravity direction is between the −Y direction and the +X direction, that is, when lower right of the drawing sheet is the gravity direction, the power supply portions may be controlled as in FIG. 7A and FIG. 7B to cancel the effect of the segregation due to the specific gravities.

Fourth Embodiment

Yet another embodiment of the present invention is described with reference to FIG. 10A to FIG. 10C and FIG. 13A. A basic configuration is similar to that of the second embodiment, and hence parts different from those of the second embodiment are described.

<EC Device>

Figure 10A:
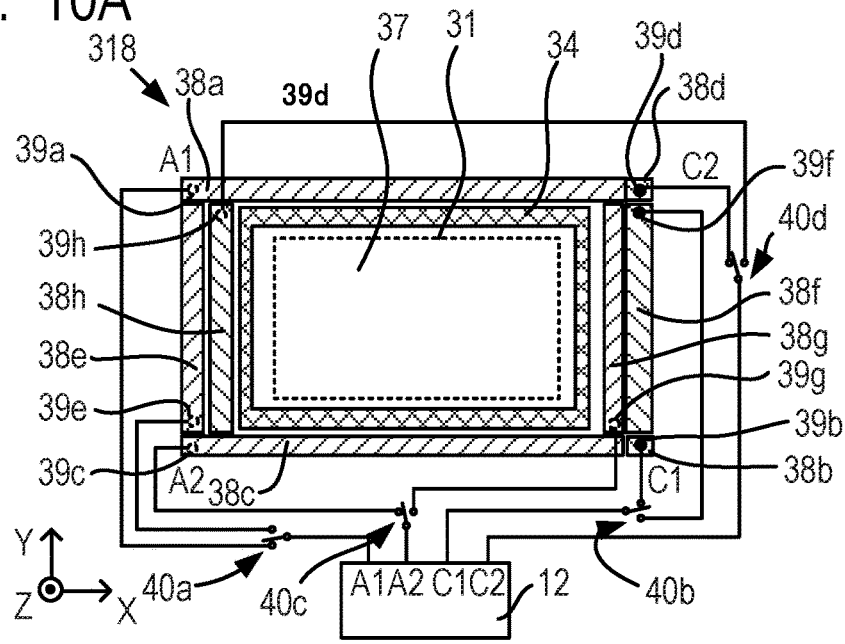
FIG. 10A, FIG. 10B, and FIG. 10C are views for illustrating an example of an EC device according to a fourth embodiment of the present invention.
Figure 10B:
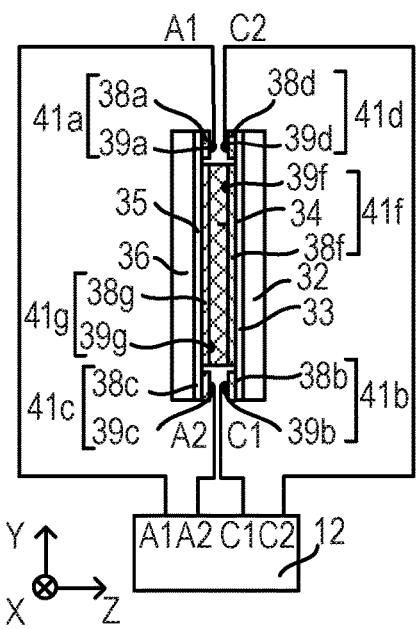
Figure 10C:
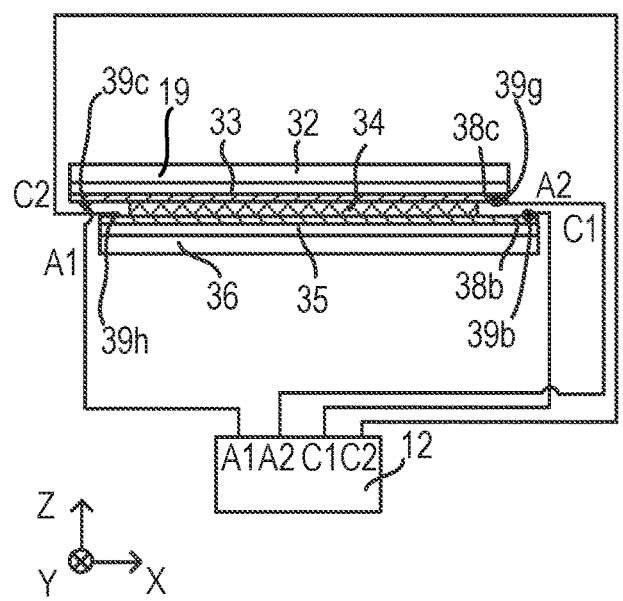

FIG. 10A to FIG. 10C are schematic views for illustrating an EC device 318 according to a fourth embodiment of the present invention, FIG. 10A is a front view, FIG. 10B is a right-side view, and FIG. 10C is a bottom view. Moreover, FIG. 13A is a plan view of electrode forming surface sides of the substrates 32 and 36 used in the fourth embodiment.

Figure 13A:
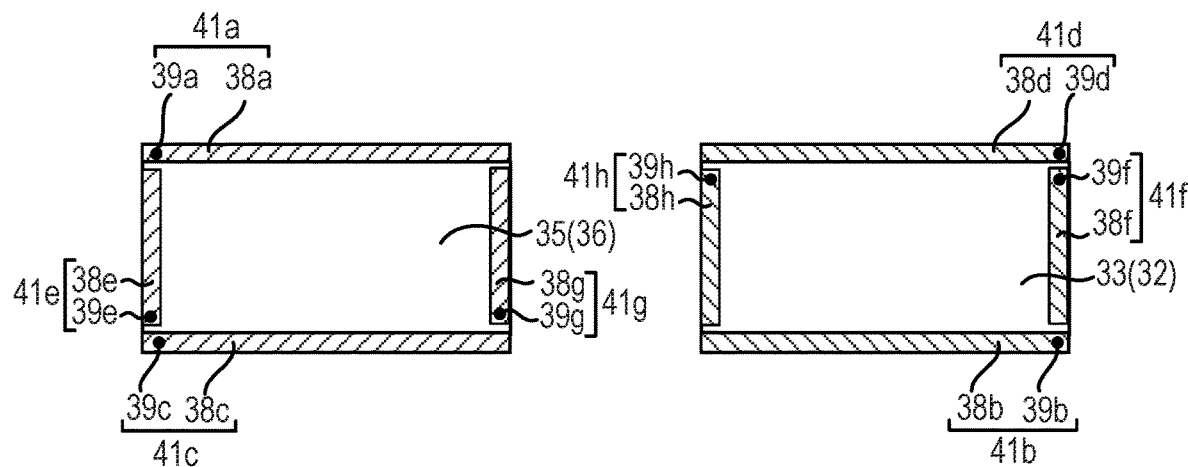
FIG. 13A and FIG. 13B are plan views of electrode forming surface sides of substrates used in the embodiments.

As illustrated in FIG. 13A, the electrode 35 on the substrate 36 has formed thereon power supply portions 41e and 41g in addition to the power supply portions 41a and 41c, which are the same as those of the second embodiment. The power supply portions 41e and 41g consist of low-resistance wirings 38e and 38g, which are respectively provided along the short sides of the electrode 35 across the effective beam area 31, and power supply terminals 39e and 39g, which are respectively provided at ends on the same side in the long-side direction of the low-resistance wirings 38e and 38g. Similarly, the electrode 33 on the substrate 32 has formed thereon power supply portions 41b, 41d, 41f, and 41h. With such disposition, as in the case where the imaging apparatus 1 is held in the so-called "vertical position", for example, the effect of the segregation due to the specific gravities can be reduced even when the EC element 19 is in the orientation in which the X-axis direction is the gravity direction.

Moreover, in FIG. 10A, changeover switches 40a to 40d may be switched depending on the output of the orientation detection unit 11 to switch the power supply portions to be used depending on the orientation (photographing orientation) of the EC element 19. In the fourth embodiment, a method of switching the power supply portions to be used through use of the changeover switches is described, but the changeover switches may not be used as long as the power supply portions to be used can be changed. A method in which wirings are selectively switched inside the transmitted light amount manipulator 12 to change the power supply portions to be used can be considered, for example.

<Drive Method>

In FIG. 10A to FIG. 10C, the low-resistance wirings are provided in each of the short sides and the long sides of the electrodes 33 and 35, and hence even when the gravity direction is the long-side direction (that is, X-axis direction) of the EC element 19, the power supply portions are provided upward and downward in the gravity direction. In other words, the power supply portions to be used may be changed depending on the detection result obtained by the orientation detection unit 11 to cancel the segregation due to the effect of the specific gravities.

When the −Y direction is the gravity direction, as illustrated in FIG. 10A to FIG. 10C, the A1 terminal is connected to the power supply terminal 39a, the C1 terminal is connected to the power supply terminal 39b, the A2 terminal is connected to the power supply terminal 39c, and the C2 terminal is connected to the power supply terminal 39d to drive the terminals as in FIG. 7A and FIG. 7B. When the +Y direction is the gravity direction, the changeover switches 40a to 40d are not changed, and the terminals are driven as in FIG. 8A and FIG. 8B.

When the +X direction is the gravity direction, the left side of FIG. 10A as seen from the front of the drawing sheet is upward in the gravity direction, and the right side as seen from the front of the drawing sheet is downward in the gravity direction. In other words, the side of the low-resistance wirings 38e and 38h is upward in the gravity direction, and the side of the low-resistance wirings 38f and 38g is downward in the gravity direction. Therefore, the changeover switches 40a to 40d may be switched from the state of FIG. 10A and FIG. 10B to use the power supply portions disposed upward and downward in the gravity direction. Specifically, the A1 terminal is connected to the power supply terminal 39e, the C1 terminal is connected to the power supply terminal 39f, the A2 terminal is connected to the power supply terminal 39g, and the C2 terminal is connected to the power supply terminal 39h to drive the terminals as in FIG. 7A and FIG. 7B. As a result, the effect of the segregation due to the specific gravities can be canceled. Moreover, when the −X direction is the gravity direction, the changeover switches 40a to 40d are switched as in the case where the +X direction is the gravity direction to drive the terminals as in FIG. 8A and FIG. 8B, with the result that the effect of the segregation due to the specific gravities can be canceled.

The cases in which the +Y direction, the −Y direction, the +X direction, and the −X direction are each the gravity direction have been described. Now, a case in which the imaging apparatus 1 is inclined between the normal position and the vertical position, that is, the gravity direction is inclined on the XY plane, is described.

When the gravity direction is parallel to the Y axis, that is, when the low-resistance wirings 38a to 38d are disposed upward or downward in the gravity direction, the power supply portions 41e to 41h are not operated to cancel the segregation due to the specific gravities. In other words, no voltage is applied to the power supply portions 41e to 41h, or the power supply portions 41e to 41h are driven such that the effect of the segregation due to the potential distribution is reduced, for example, such that t1=t2 in FIG. 7A and FIG. 8A.

Similarly, when the gravity direction is parallel to the X axis, that is, when the low-resistance wirings 38e to 38h are disposed upward or downward in the gravity direction, the power supply portions 41a to 41d are not operated to cancel the segregation due to the specific gravities. In other words, no voltage is applied to the power supply portions 41a to 41d, or the power supply portions 41a to 41d are driven such that the effect of the segregation due to the potential distribution is reduced.

When the gravity direction is inclined on the XY plane, drive balance of the power supply portions 41a to 41h may be changed. In other words, the power supply portions 41a to 41h are controlled independently.

When the gravity direction is the −Y direction, voltages are applied to the power supply portions 41e to 41h, which are provided in the left and right direction of the drawing sheet of FIG. 10A, such that t1=t2 in FIG. 7A. Under such state, when the gravity direction starts to be inclined in the +X direction (when the left side of FIG. 10A as seen from the front of the drawing sheet is downward in the gravity direction), voltages applied to the power supply portion 41g (A2 terminal) are gradually controlled such that t2>t1. Moreover, at the same time, voltages applied to the power supply portion 41e (A1 terminal) are gradually controlled such that t2>t1. Through controlling the terminals as described above, even when the gravity direction is inclined on the XY plane, the effect of the segregation due to the specific gravities can be canceled through use of the effect of the segregation due to the potential distribution.

As described above, the power supply portions to be used are selected depending on the output from the orientation detection unit 11, and at the same time, the power supply portions are controlled in consideration of the gravity direction, with the result that the effect of the segregation due to the specific gravities can be canceled irrespective of the orientation of the EC element 19.

Fifth Embodiment

Yet another embodiment of the present invention is described with reference to FIG. 11A and FIG. 11B and FIG. 13B. A basic configuration is similar to the second embodiment, and hence parts different from those of the second embodiment are described.

<EC Device>

Figure 11A:
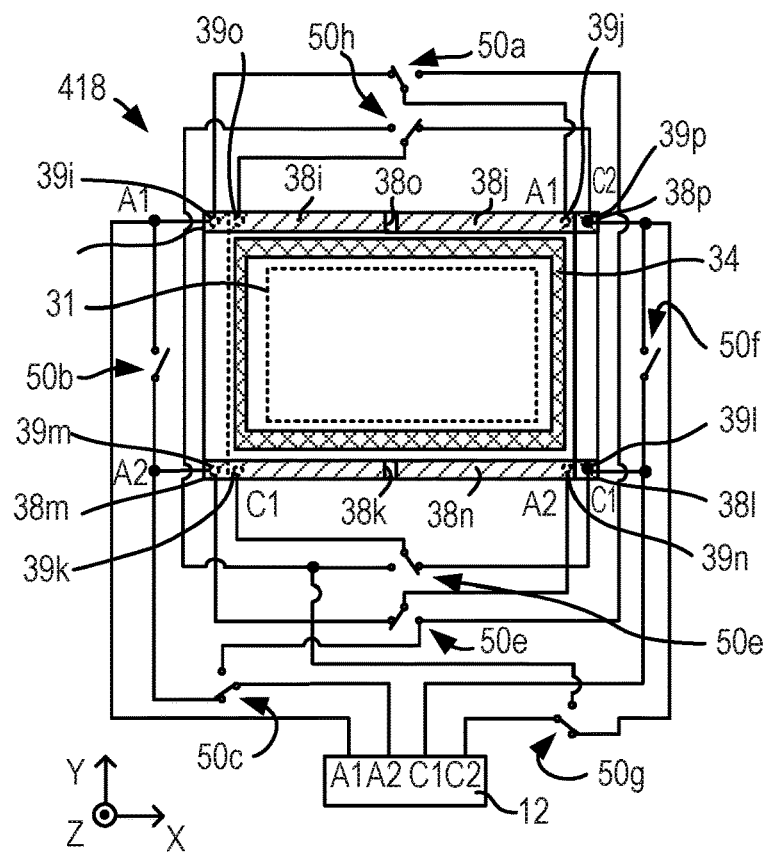
FIG. 11A and FIG. 11B are views for illustrating an example of an EC device according to a fifth embodiment of the present invention.
Figure 11B:
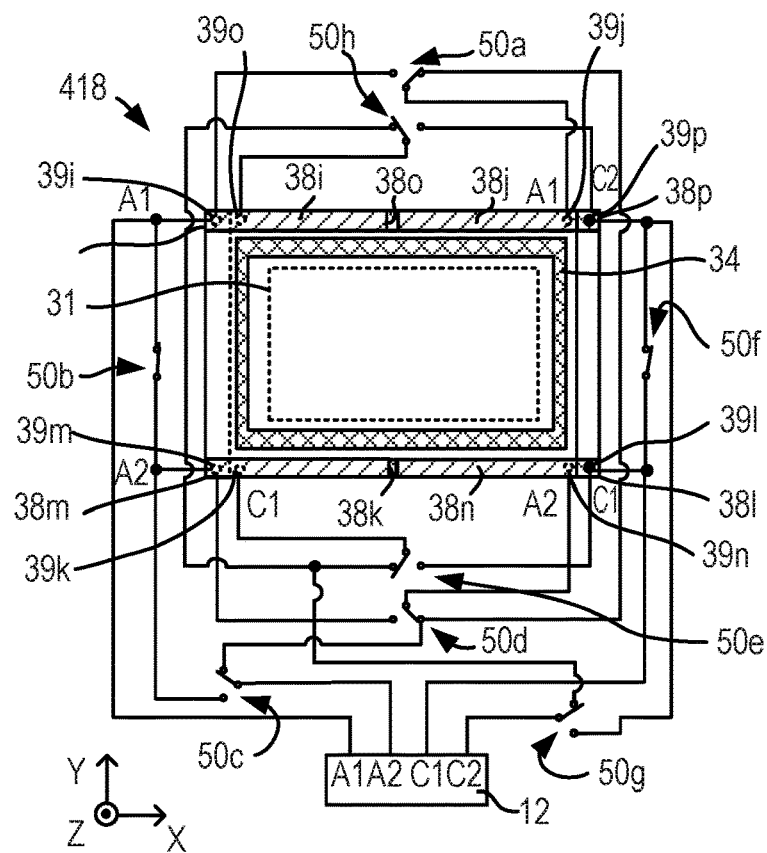

FIG. 11A and FIG. 11B are schematic views for illustrating an EC device 418 according to a fifth embodiment of the present invention, and in FIG. 11A and FIG. 11B, states in which connection states of the changeover switches are different are illustrated. Moreover, FIG. 13B is a plan view of electrode forming surface sides of the substrates 32 and 36 used in the fifth embodiment.

Figure 13B:
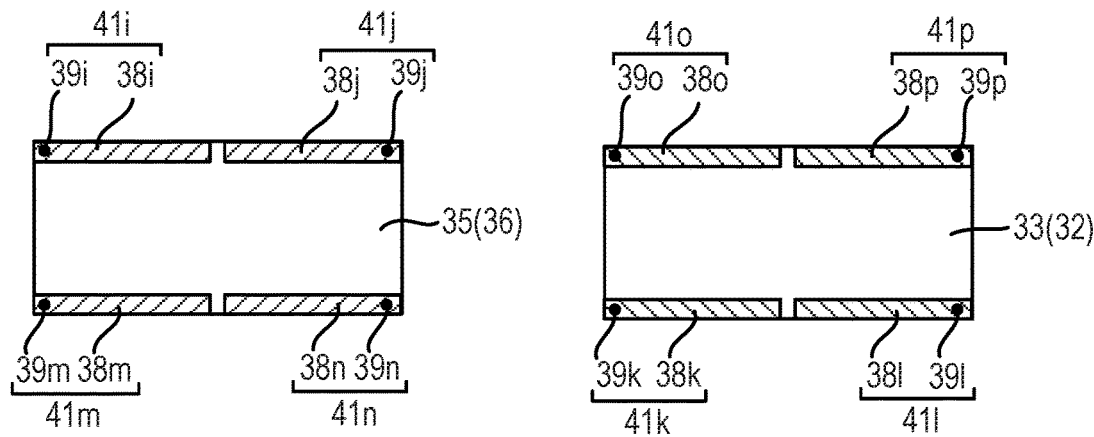

As illustrated in FIG. 13B, in the fifth embodiment, a plurality of low-resistance wirings are disposed along one side of each of the electrodes 33 and 35. Specifically, the low-resistance wirings 38a to 38d in the second embodiment are divided into low-resistance wirings 38i and 38j, low-resistance wirings 38k and 38l, low-resistance wirings 38m and 38n, and low-resistance wirings 38o and 38p, respectively. Moreover, the low-resistance wirings 38i to 38p have provided thereon power supply terminals 39i to 39p in the vicinity of the corners of the electrodes 33 and 35. Moreover, changeover switches 50a to 50h may be switched depending on the output from the orientation detection unit 11 to switch the power supply portions to be used depending on the orientation (photographing orientation) of the EC element 19. The fifth embodiment is similar to the fourth embodiment in that the changeover switches 50 may not be used as long as the power supply portions to be used can be changed.

<Drive Method>

When the gravity direction is parallel to the Y axis, that is, when the short-side direction of the EC element 19 is the gravity direction, the changeover switches 50a to 50h are connected as in FIG. 11A such that the low-resistance wirings arrayed in the long-side direction of the EC element 19 have the same potential. Specifically, the changeover switches 50a to 50h are connected such that the low-resistance wirings 38i and 38j have the same potential, and such that the low-resistance wirings 38k and 38l have the same potential. Similarly, the changeover switches 50a to 50h are connected such that the low-resistance wirings 38m and 38n have the same potential, and such that the low-resistance wirings 38o and 38p have the same potential. Through such connection, the power supply portions having the same potential are provided upward and downward in the gravity direction. Therefore, the terminals A1, A2, C1, and C2 may be controlled as in the cases of FIG. 7A and FIG. 7B, and FIG. 8A and FIG. 8B to cancel the effect of the segregation due to the specific gravities through use of the segregation due to the potential distribution.

Meanwhile, when the gravity direction is parallel to the X axis, that is, when the long-side direction of the EC element 19 is the gravity direction, the power supply portions are connected as in FIG. 11B such that the low-resistance wirings arrayed in the short-side direction of the EC element 19 have the same potential. Specifically, the power supply portions are connected such that the low-resistance wirings 38i and 38m have the same potential, and such that the low-resistance wirings 38l and 38p have the same potential. Similarly, the power supply portions are connected such that the low-resistance wirings 38n and 38j have the same potential, and such that the low-resistance wirings 38o and 38k have the same potential. Through such connection, the power supply portions having the same potential are provided upward and downward in the gravity direction. Therefore, the terminals A1, A2, C1, and C2 may be controlled as in the cases of FIG. 7A and FIG. 7B and FIG. 8A and FIG. 8B to cancel the effect of the segregation due to the specific gravities through use of the segregation due to the potential distribution.

Moreover, a case in which the gravity direction is inclined on the XY plane, that is, an intermediate case between FIG. 11A and FIG. 11B is described. In this case, as in the fourth embodiment, the power supply portions are controlled independently to cancel the segregation due to the effect of the specific gravities. In FIG. 11A, the up-down direction of the drawing sheet is the gravity direction, and hence the power supply portions are connected such that the terminals arrayed left and right in the drawing sheet have the same potential. Meanwhile, in FIG. 11B, the left and right direction of the drawing sheet is the gravity direction, and hence the power supply portions are connected such that the terminals arrayed up and down in the drawing sheet have the same potential. For example, when the gravity direction is inclined from the −Y direction to the +X direction, that is, such that the terminals on the left side of the drawing sheet are upward in the gravity direction, the voltage applied to the A1 terminal (power supply terminal 39j) and the C2 terminal (power supply terminal 39p) in the upper right of the drawing sheet of FIG. 11A is gradually reduced. At the same time, the voltage applied to the A2 terminal (power supply terminal 39m) and the C1 terminal (power supply terminal 39k) in the lower left of the drawing sheet is gradually increased. As a result, the effect of the segregation due to the potential distribution in the horizontal direction can be reduced while the effect of the segregation due to the specific gravities in the gravity direction is canceled.

Through changing connections of the power supply terminals as in FIG. 11A and FIG. 11B or changing control on the power supply portions depending on the signal from the orientation detection unit 11, the power supply portions can be provided in the up-down direction of gravity irrespective of the orientation of the EC element 19. Therefore, through the selection of the power supply portions to be used and the change in control method, the effect of the segregation due to the specific gravities can be canceled through use of the effect of the segregation due to the potential distribution irrespective of the orientation of the EC element 19.

According to the present invention, the effect of the segregation can be reduced irrespective of the orientation of the EC element even when the EC device is used for a long time.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-101553, filed May 23, 2017, which is hereby incorporated by reference herein in its entirety.

What is claimed is:

1. An electrochromic device, comprising:
a pair of electrodes;
an electrochromic element including an electrochromic layer disposed between the pair of electrodes;
a drive unit, which is connected to a power supply portion included in each of the pair of electrodes to drive the electrochromic element;
a controller, which is configured to control current or voltage supplied to the power supply portion; and
an orientation detection unit, which is configured to detect an orientation of the electrochromic element,
wherein the controller is configured to control the current or the voltage depending on output from the orientation detection unit, and
wherein the controller is configured to control the power supply portion depending on a gravity direction detected by the orientation detection unit so that an amount of charge that is generated when the power supply portion provided upward in the gravity direction is an anode becomes larger than an amount of charge that is generated when the power supply portion provided downward in the gravity direction is the anode.

2. The electrochromic device according to claim 1, wherein the controller is configured to change, when the gravity direction detected by the orientation detection unit is parallel to a stacking direction of the pair of electrodes, a direction of a potential to be applied to the power supply portion at predetermined time intervals.

3. The electrochromic device according to claim 1, further comprising a drive time detection unit, which is configured to detect drive time of the electrochromic element,
wherein the controller is configured to control the power supply portion depending on output from the drive time detection unit.

4. The electrochromic device according to claim 1, wherein the pair of electrodes each include a plurality of power supply portions, and
wherein the controller is configured to select a power supply portion to be connected to the drive unit depending on the output from the orientation detection unit.

5. The electrochromic device according to claim 1, wherein the pair of electrodes each have a rectangular shape, and
wherein the power supply portion included in each of the pair of electrodes includes:
a low-resistance wiring, which is disposed along one of at least one long side and at least one short side of the each of the pair of electrodes; and
a power supply terminal, which is connected to the low-resistance wiring.

6. The electrochromic device according to claim 1, wherein the electrochromic layer contains:
at least one kind of anodic electrochromic material;
at least one kind of cathodic electrochromic material; and
a solvent.

7. The electrochromic device according to claim 1, wherein the electrochromic layer is in a solution state.

8. The electrochromic device according to claim 1, wherein the drive unit is configured to apply an alternating-current voltage to the power supply portion.

9. The electrochromic device according to claim 5, wherein the low-resistance wiring includes a low-resistance wiring that is disposed along at least one long side of the each of the pair of electrodes, and a low-resistance wiring that is disposed along at least one short side of the each of the pair of electrodes.

10. The electrochromic device according to claim 5, wherein the low-resistance wiring is disposed continuously along a long side and a short side of the each of the pair of electrodes.

11. The electrochromic device according to claim 5, wherein the low-resistance wiring includes a plurality of low-resistance wirings, which are disposed along one side of the each of the pair of electrodes.

12. The electrochromic device according to claim 6, wherein each of the at least one kind of anodic electrochromic material and the at least one kind of cathodic electrochromic material is a low-molecular weight organic compound.

13. An imaging apparatus, comprising:
a photographing optical system;
an imaging element; and
the electrochromic device of claim 1 disposed between the photographing optical system and the imaging element.

14. An electrochromic device, comprising:
a pair of electrodes;
an electrochromic element including an electrochromic layer disposed between the pair of electrodes;
a drive unit, which is connected to a power supply portion connected to each of the pair of electrodes to drive the electrochromic element;
a controller, which is configured to control current or voltage supplied to the power supply portion; and
an orientation detection unit, which is configured to detect an orientation of the electrochromic element,
wherein the controller is configured to control the current or the voltage depending on output from the orientation detection unit,
wherein the pair of electrodes each have a rectangular shape, and
wherein the power supply portion included in each of the pair of electrodes includes:
a low-resistance wiring, which is disposed along one of at least one long side and at least one short side of the each of the pair of electrodes; and
a power supply terminal, which is connected to the low-resistance wiring.

15. The electrochromic device according to claim 14, wherein the controller is configured to control the power supply portion depending on a gravity direction detected by the orientation detection unit so that an amount of charge that is generated when the power supply portion provided upward in the gravity direction is an anode becomes larger than an amount of charge that is generated when the power supply portion provided downward in the gravity direction is the anode.

16. The electrochromic device according to claim 14, wherein the pair of electrodes each include a plurality of power supply portions, and
wherein the controller is configured to select a power supply portion to be connected to the drive unit depending on the output from the orientation detection unit.

17. An electrochromic device, comprising:
a pair of electrodes;
an electrochromic element including an electrochromic layer disposed between the pair of electrodes;
a drive unit, which is connected to a power supply portion connected to each of the pair of electrodes to drive the electrochromic element;
a controller, which is configured to control current or voltage supplied to the power supply portion; and
an orientation detection unit, which is configured to detect an orientation of the electrochromic element,
wherein the controller is configured to control the current or the voltage depending on output from the orientation detection unit,
wherein the pair of electrodes each include a plurality of power supply portions, and
wherein the controller is configured to select a power supply portion to be connected to the drive unit depending on the output from the orientation detection unit.

18. The electrochromic device according to claim 17, wherein the controller is configured to control the power supply portion depending on a gravity direction detected by the orientation detection unit so that an amount of charge that is generated when the power supply portion provided upward in the gravity direction is an anode becomes larger than an amount of charge that is generated when the power supply portion provided downward in the gravity direction is the anode.

19. The electrochromic device according to claim 18, wherein the pair of electrodes each have a rectangular shape, and
wherein the power supply portion included in each of the pair of electrodes includes:
a low-resistance wiring, which is disposed along one of at least one long side and at least one short side of the each of the pair of electrodes; and
a power supply terminal, which is connected to the low-resistance wiring.

20. An imaging apparatus, comprising:
a photographing optical system;
an imaging element; and
the electrochromic device of claim 17 disposed between the photographing optical system and the imaging element.

* * * * *